United States Patent
Mackie

(10) Patent No.: US 7,610,189 B2
(45) Date of Patent: Oct. 27, 2009

(54) METHOD AND APPARATUS FOR EFFICIENT SEGMENTATION OF COMPOUND WORDS USING PROBABILISTIC BREAKPOINT TRAVERSAL

(75) Inventor: Andrew William Mackie, Los Gatos, CA (US)

(73) Assignee: Nuance Communications, Inc., Burlington, MA (US)

(*) Notice: Subject to any disclaimer, the term of this patent is extended or adjusted under 35 U.S.C. 154(b) by 1021 days.

(21) Appl. No.: 10/042,528

(22) Filed: Oct. 18, 2001

(65) Prior Publication Data
US 2003/0097252 A1 May 22, 2003

(51) Int. Cl.
*G06F 17/28* (2006.01)
(52) U.S. Cl. .......................................... 704/9
(58) Field of Classification Search ............... 704/9
See application file for complete search history.

(56) References Cited

U.S. PATENT DOCUMENTS

| | | | |
|---|---|---|---|
| 4,672,571 A | 6/1987 | Bass et al. | |
| 4,777,617 A | 10/1988 | Frisch et al. | |
| 5,510,981 A | 4/1996 | Berger et al. | 364/419.02 |
| 5,754,972 A * | 5/1998 | Baker et al. | 704/200 |
| 5,768,603 A | 6/1998 | Brown et al. | 704/9 |
| 5,774,834 A | 6/1998 | Visser | |
| 5,794,177 A * | 8/1998 | Carus et al. | 704/9 |
| 5,797,122 A * | 8/1998 | Spies | 704/255 |
| 5,867,812 A | 2/1999 | Sassano | |
| 6,035,268 A * | 3/2000 | Carus et al. | 704/9 |
| 6,349,282 B1 * | 2/2002 | Van Aelten et al. | 704/257 |
| 6,393,388 B1 * | 5/2002 | Franz et al. | 704/4 |
| 6,393,399 B1 | 5/2002 | Even | 704/257 |
| 6,473,730 B1 * | 10/2002 | McKeown et al. | 704/9 |
| 6,473,754 B1 * | 10/2002 | Matsubayashi et al. | 707/5 |
| 6,754,617 B1 * | 6/2004 | Ejerhed | 704/9 |
| 6,789,088 B1 * | 9/2004 | Lee et al. | 707/104.1 |
| 6,839,670 B1 | 1/2005 | Stammler et al. | 704/251 |
| 6,847,734 B2 * | 1/2005 | Hamamura | 382/229 |
| 2001/0009009 A1 * | 7/2001 | Iizuka | 707/539 |
| 2003/0014405 A1 * | 1/2003 | Shapiro et al. | 707/5 |

FOREIGN PATENT DOCUMENTS

| | | |
|---|---|---|
| DE | 195 10 083 | 9/1996 |
| EP | 0 508 225 | 10/1992 |
| EP | 0 566 848 | 10/1993 |
| WO | WO 93 18506 | 9/1993 |

OTHER PUBLICATIONS

Berton et al., "Compound Words in Large-Vocabulary German Speech Recognition Systems," Spoken Language, pp. 1165-1168, 1996.

(Continued)

*Primary Examiner*—David R Hudspeth
*Assistant Examiner*—Jakieda R Jackson
(74) *Attorney, Agent, or Firm*—Sunstein Kann Murphy & Timbers LLP

(57) ABSTRACT

A method for segmenting a compound word in an unrestricted natural-language input is disclosed. The method comprises receiving a natural-language input consisting of a plurality of characters. Next, a set of probabilistic breakpoints based on a probabilistic breakpoint analysis is constructed in the natural-language input. A plurality of linkable components is identified by traversal of substrings of the natural-language input delimited by the set of probabilistic breakpoints. Finally, a segmented string consisting of a plurality of linkable components spanning the natural-language input is returned. The segmented string can be interpreted as a compound word.

10 Claims, 20 Drawing Sheets

OTHER PUBLICATIONS

Geutner, P., "*Using morphology towards better large-vocabulary speech recognition systems*," 1995 International Conference on Acoustics, Speech, and Signal Processing, pp. 445-448.

Spies, M., "*A Language Model for Compound Words in Speech Recognition*," European Conference on Speech Communication and Technology, vol. Conf. 4, pp. 1767-1770, 1995.

* cited by examiner

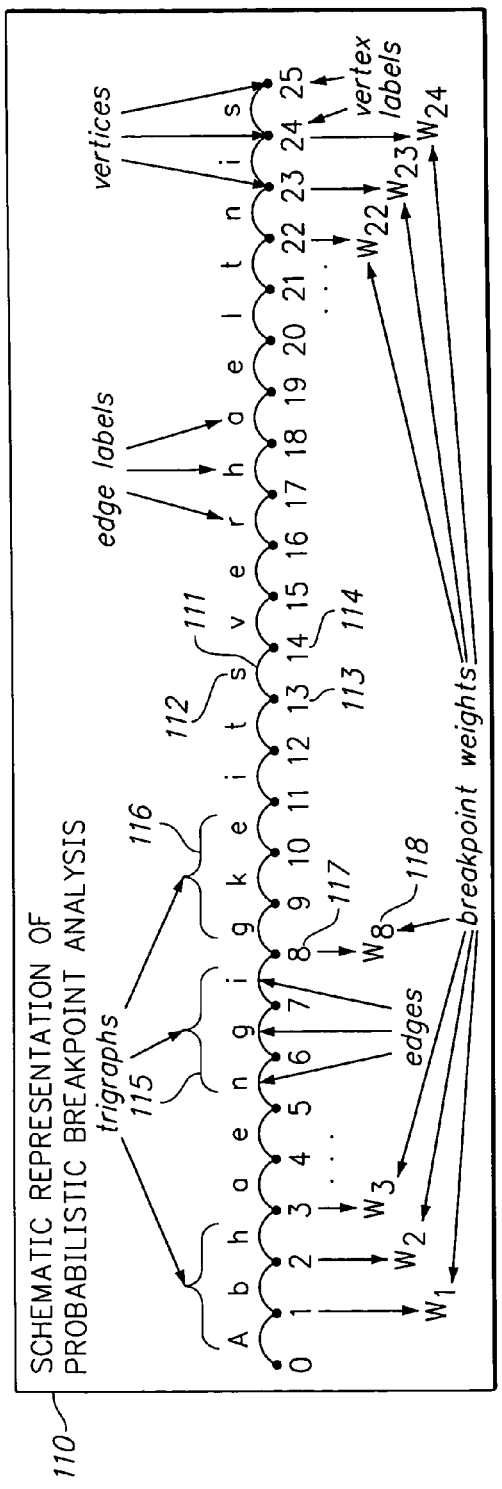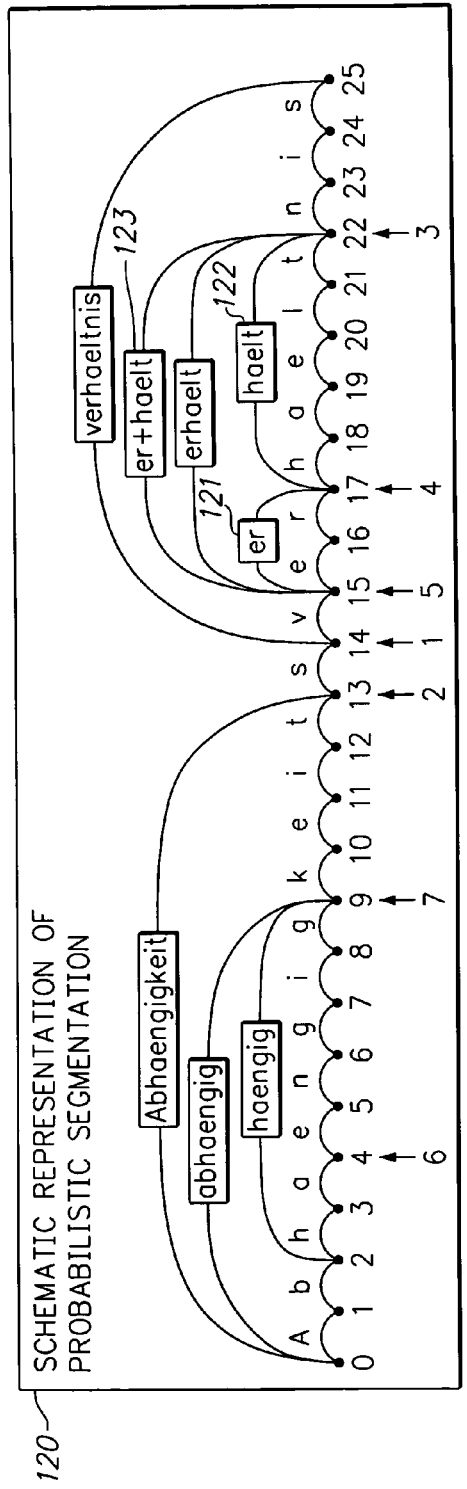

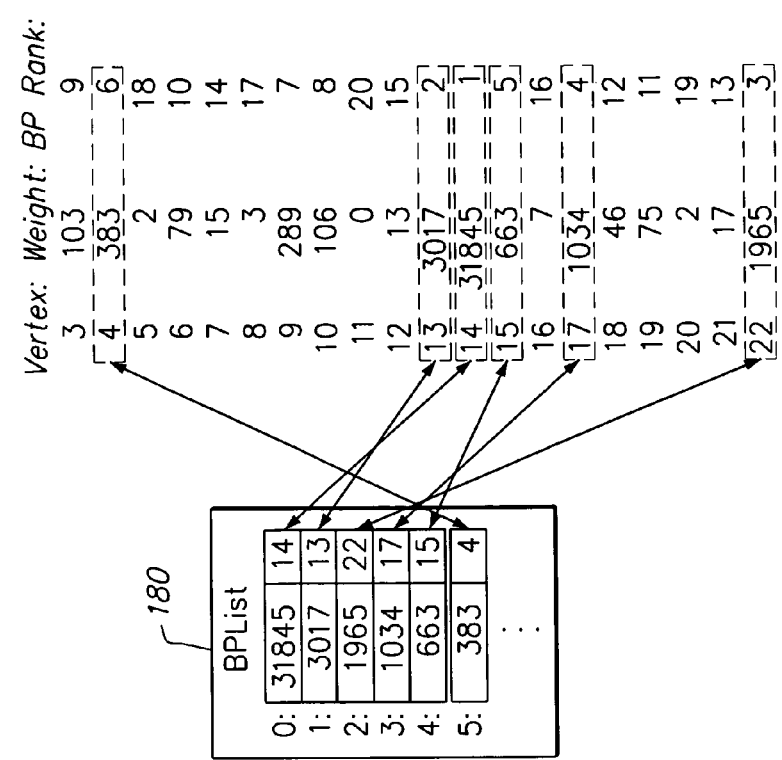

FIG. 8

```
ANALYZING: Abhaengigkeitsverhaeltnis
 3: Abh+aen   END=0      START=103    TOTAL=103     9
 4: bha+eng   END=3      START=380    TOTAL=383     6
 5: hae+ngi   END=2      START=0      TOTAL=2       18
 6: aen+gig   END=30     START=49     TOTAL=79      10
 7: eng+igk   END=15     START=0      TOTAL=15      14
 8: ngi+gke   END=3      START=0      TOTAL=3       17
 9: gig+kei   END=70     START=219    TOTAL=289     7
10: igk+eit   END=2      START=104    TOTAL=106     8
11: gke+its   END=0      START=0      TOTAL=0       20
12: kei+tsv   END=13     START=0      TOTAL=13      15
13: eit+sve   END=3005   START=12     TOTAL=3017    2
14: its+ver   END=123    START=31722  TOTAL=31845   1
15: tsv+erh   END=0      START=633    TOTAL=663     5
16: sve+rha   END=0      START=7      TOTAL=7       16
17: ver+hae   END=301    START=733    TOTAL=1034    4
18: erh+ael   END=1      START=45     TOTAL=46      12
19: rha+elt   END=5      START=70     TOTAL=75      11
20: hae+ltn   END=2      START=0      TOTAL=2       19
21: ael+tni   END=17     START=0      TOTAL=17      13
22: elt+nis   END=1915   START=50     TOTAL=1965    3
```

FIG. 3

Breakpoint 1 is at vertex 14 (score=31845):
   Test (1)='Abhaengigkeits' [0, 14]
   Test (2)='verhoeltnis' [14, 25] -- FOUND: verhoeltnis
  Pending Insertion: [14, 25]: verhoeltnis <+LL, +RL> -- COMPLETED
    Inspecting Leftward Edge: [13, 14]: s <+LL, +RL>
     -- PROPAGATED (as s + verhoeltnis from 13 to 25)
  Pending Insertion: [13, 25]: s + verhoeltnis <-LL, +RL> -- COMPLETED Breakpoint 2 is at vertex 13 (score=3017):
   Test (1)='Abhaengigkeit' [0, 13] -- FOUND: Abhaengigkeit
  Pending Insertion: [0, 13]: Abhaengigkeit <+LL, +RL> -- COMPLETED
    Inspecting Rightward Edge: [13, 14]: s <+LL, +RL>
     -- PROPAGATED (as 'Abhaengigkeit + s' from 0 to 14)
  Pending Insertion: [0, 14]: Abhaengigkeit + s <+LL, -RL> -- COMPLETED
    Inspecting Rightward Edge: [14, 15]: verhoeltnis <+LL, +RL>
     -- PROPAGATED (as 'Abhaengigkeit + s + verhoeltnis' from 0 to 25)

-- SUCCEEDED: Abhaengigkeit + s + verhoeltnis
  (3 lexicon accesses required [0.93%]); BP=2

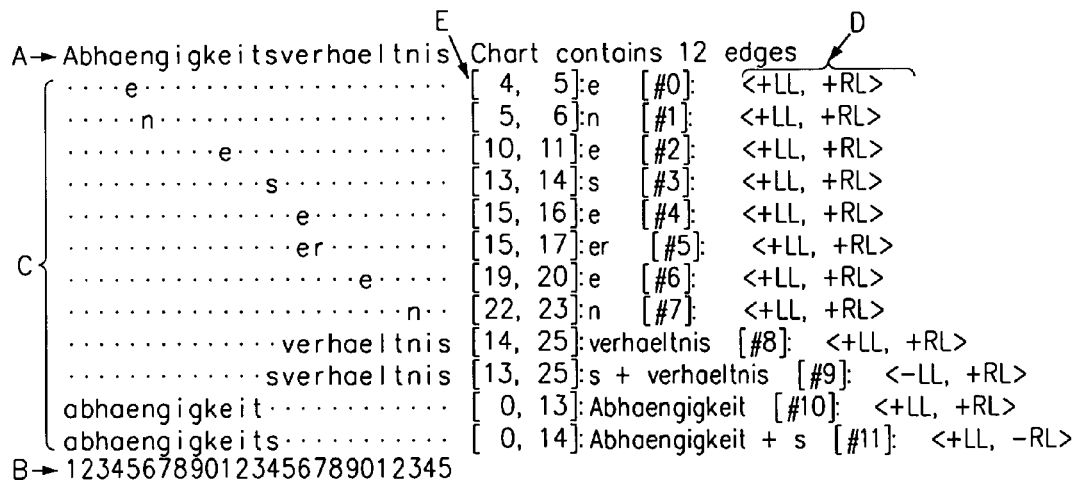

FIG. 6

```
FAILED: Geschwerkschaftsorganisation
Best guess is: {Gesch} Werk + schaft + s + Organisation
(116 lexicon accesses required [28.64%]); BP=18

Geschwerkschaftsorganisation            Chart contains 32 edges
....werk.........................  [ 5,  9]:  Werk                            [#2552]:  <+LL, +RL>
....werks........................  [ 5, 10]:  Werk + s                        [#2553]:  <+LL, -RL>
....werks........................  [ 5, 10]:  Werks                           [#2554]:  <+LL, +RL>
........schaft..................   [ 9, 15]:  schaft                          [#2555]:  <+LL, +RL>
........schafts.................   [ 9, 16]:  schaft + s                      [#2556]:  <+LL, -RL>
....werkschaft..................   [ 5, 15]:  Werk + schaft                   [#2557]:  <+LL, +RL>
....werkschaft..................   [ 5, 15]:  Werk + schaft                   [#2558]:  <+LL, +RL>
................organisation.....  [16, 28]:  Organisation                    [#2560]:  <+LL, +RL>
...............sorganisation.....  [15, 28]:  s + Organisation                [#2561]:  <-LL, +RL>
........schaftsorganisation......  [ 9, 28]:  schaft + s + Organisation       [#2562]:  <+LL, +RL>
....werkschaftsorganisation......  [ 5, 28]:  Werk + schaft + s + Organisation [#2563]: <+LL, +RL>
.................gani............  [18, 22]:  Gani                            [#2565]:  <+LL, +RL>
.................ganis...........  [18, 23]:  Gani + s                        [#2566]:  <+LL, -RL>
..........haft...................  [11, 15]:  Haft                            [#2567]:  <+LL, +RL>
..........hafts..................  [11, 16]:  Haft + s                        [#2568]:  <+LL, -RL>
..........haftsorganisation......  [11, 28]:  Haft + s + Organisation         [#2569]:  <+LL, +RL>
..................anis...........  [19, 23]:  Anis                            [#2570]:  <+LL, +RL>
...............organ.............  [16, 21]:  Organ                           [#2571]:  <+LL, +RL>
..............sorgan.............  [15, 21]:  s + Organ                       [#2572]:  <-LL, +RL>
........schaftsorgan.............  [ 9, 21]:  schaft + s + Organ              [#2573]:  <-LL, +RL>
....werkschaftsorgan.............  [ 5, 21]:  Werk + schaft + s + Organ       [#2574]:  <+LL, +RL>
..........haftsorgan.............  [11, 21]:  Haft + s + Organ                [#2576]:  <+LL, +RL>
..schwer.........................  [ 2,  8]:  schwer                          [#2577]:  <+LL, +RL>
.eschwer.........................  [ 1,  8]:  e + schwer                      [#2578]:  <-LL, +RL>
12345678901234567890123456789012345678
```

FIG. 9

METHOD AND APPARATUS FOR EFFICIENT SEGMENTATION OF COMPOUND WORDS USING PROBABILISTIC BREAKPOINT TRAVERSAL

BACKGROUND OF THE INVENTION

1. Field of the Invention

The present invention involves the automated analysis of unrestricted natural-language input. In particular, the present invention pertains to an improved method and apparatus for the efficient segmentation of compound words in unrestricted natural-language input using probabilistic breakpoint traversal.

2. State of the Art

Many languages, such as German, permit the construction of novel compound words by a process of iterative concatenation (often including the incorporation of additional morphemes as linking elements). Thus texts in these languages are likely to include very long words that do not occur in any dictionary of the language. For example, an analysis of a corpus of German texts containing approximately five million words yielded almost 60,000 different words at least 15 letters long (out of a vocabulary of approximately 230,000 words), only about 10,000 of which were found in a 503,000-entry German dictionary. A natural-language processing system that relied only on such a dictionary to identify words in this text would therefore be likely to recognize less than 20% of the words of at least 15 letters in length.

A typical example of such a word is the German compound Abschreibungsmöglichkeiten. This compound is constructed by concatenating the two words Abschreibung and möglichkeiten by means of the "linking morpheme" s. In the discussion that follows, the decomposition of a compound into its component words (and linking morphemes, if any) is referred to as a "segmentation" of the compound and is represented by character strings separated by the symbol "+"; for example, the segmentation of the compound Abschreibungsmöglichkeiten is represented as Abschreibung+s+möglichkeiten.

The segmentation of compound words is an important aspect of natural-language processing (NLP), particularly for Germanic languages (e.g., German and Dutch, but also the Scandinavian languages and, to a lesser degree, English). As noted in U.S. Pat. No. 4,672,571 to Bass et al. [hereinafter Bass '571, the disclosure of which is incorporated by reference herein]: "In many languages, particularly Germanic languages, word compounding is an active way of creating new words in these languages; therefore, storing all meaningful compounds in a dictionary data base is, quite simply, impossible" (emphasis in original). Thus a compound-segmentation algorithm is necessary for NLP in these languages, and several such algorithms have been proposed in the art, as follows.

U.S. Pat. No. 5,867,812 to Sassano [hereinafter Sassano '812, the disclosure of which is incorporated by reference herein], teaches a "registration apparatus for [a] compound-word dictionary." The purpose of this invention is to improve a Japanese-English machine translation system, and consequently it includes a "word segmenter" component to segment Japanese compounds. Due to the highly restricted syllabic structure of Japanese, compound segmentation based on syllabic structure is straightforward; e.g., the Japanese compound torukogo (discussed in Sassano '812) is segmented as toruko+go based on its syllabic decomposition of to-ru-ko-go.

Purely syllable-based segmentation is not practical for languages such as German or English, which have considerably more complex syllable structures than Japanese (as noted in U.S. Pat. No. 5,797,122 to Spies [hereinafter Spies '122, the disclosure of which is incorporated by reference herein], German has approximately 5,000 different syllables). Additionally, because some of the linking morphemes in German are consonants, one or more segmentation boundaries of a German compound can actually occur within a syllable (e.g., in Abschreibungsmöglichkeiten, the first segmentation boundary occurs within the third syllable of the word; i.e., "bung+s").

U.S. Pat. No. 5,774,834 to Visser [hereinafter Visser '834, the disclosure of which is incorporated by reference herein], teaches a "system and method for correcting a string of characters by skipping to pseudo-syllable borders in a dictionary" (emphasis added). Specifically, "a retrieving unit retrieves an entry of a dictionary which corresponds to an input character string while comparing input characters, one by one, with entries of TRIE tables stored in a dictionary storing unit." In the case that an input character "does not coincide with any of the entries in the currently-used TRIE table, a skipping unit locates a next effective pseudo-syllable border in the input character string to find candidates of those TRIE tables which correspond to the effective pseudo-syllable border." Like the system disclosed in U.S. Pat. No. 4,777,617 to Frisch et al. [hereinafter Frisch '617, the disclosure of which is incorporated by reference herein], this invention depends on a specific dictionary architecture (in this case a trie). Visser '834 addresses a known problem of using tries to analyze possibly defective input strings (like Frisch '617, spelling correction is the major aim of this invention) by means of the "skipping unit."

A different approach (which is generally more suitable for Germanic languages than the syllable-based segmentation approaches discussed above) is presented in Frisch '617, which teaches a "method for verifying spelling of compound words." Specifically, it supplements the "basic technology of looking up words in a dictionary . . . by the association of component flags with each word and by the application of powerful tree-scanning techniques that isolate the components of compound words and determine their correctness in isolation and in association with each other."

The usage of tree-scanning techniques in Frisch '617 is necessary because of the storage architecture of its dictionary. The usage of "component flags" is necessary because the invention disclosed in Frisch '617 is a spelling verifier and consequently requires a means of determining when a compound word is "wrong." However, it is not unusual in German for a compound word to contain acronyms or foreign words. For example, although the word "Internet" does not occur in the 503,000-word German lexicon referenced above, it occurs frequently in the 1998 volume of Der Spiegel, and also forms compounds with many other words, both German and foreign (e.g., Internetsurfer, InternetBuchanbeiter, Internetzugriffen, Internetangebot, etc.). Thus a means of dealing with out-of-dictionary elements in the compound would be desirable.

Finally, a bottom-up compound segmentation technique based on unigraph breakpoints is disclosed in Bass '571. This technique is discarded by Bass '571, in favor of a recursive, top-down segmentation technique, based on four "significant limitations" as follows:

1) "Likely break points are also common letter pairs at places other than the joints between compound constituents" (col. 4, lines 2-4). For example, because many words of English end with "s" and start with "t", the point between the letters "s" and "t" is a likely candidate for a "joint"; however, the letter pair "st" also happens occur in many English words that are not compounds.

2) "Not all misspelled words will be correctly identified as such because compounds composed of two unrelated but correctly spelled words which may be parsed into two correctly spelled words are verified as correctly spelled words" (col. 2, lines 25-29).

3) "Correctly spelled words may suffer from mishyphenation on the basis of break points when the wrong pair of words is identified as the constituents of the compound" (col. 2, lines 55-58).

4) "Certain words have forms which are used only when the word is combined with others in compounds" (col. 2, lines 64-66).

It is necessary for a compound-segmentation method based on breakpoint analysis to successfully address each of these limitations, as is done by the present invention.

In summary, the complexity of Germanic compounding precludes the purely syllable-based approach typically used for compound-segmentation in languages such as Japanese (Sassano '812). A method such as Visser '834, which employs "pseudo-syllable boundaries," is better adapted to Germanic compounding, however this requires the usage of a specific dictionary architecture (i.e., a trie). Similarly, the other techniques in the art that are specifically intended to segment Germanic compounds (Bass '571, Frisch '617) are also top-down approaches that depend on specific dictionary architectures.

Accordingly, it would be desirable to have a method that could receive a compound word (in German or another language with similar compounding properties) as input and efficiently produce its correct segmentation as output. Additionally, in the case that a segmentation cannot be determined (e.g., because the compound contains a word or acronym not in the system's lexicon), it would be desirable to have the method construct a partial segmentation of the compound so that the unrecognizable part(s) of the word are isolated for further analysis. These advantages and others are provided by the present invention, as disclosed below.

SUMMARY OF THE INVENTION

The present invention is directed to a linguistic processing apparatus and method for rapidly and accurately segmenting compound words in unrestricted natural-language input.

The present invention employs a bottom-up, statistical approach to compound-word segmentation that is independent of dictionary architecture and is relatively robust to spelling errors and neologisms. Because the present invention chooses breakpoints probabilistically, it is extremely efficient, typically converging to a correct segmentation after only a few breakpoints have been tested even for very long compound words (25+ letters). Additionally, the present invention also specifically addresses the limitations of the bottom-up approach enumerated by Bass '571, thus resulting in additional processing efficiencies.

The bottom-up approach to compound-word segmentation used by the present invention may be divided into three steps, as follows. First, an ordered set of breakpoints is identified in the compound using a bottom-up, statistically based method of probabilistic breakpoint analysis, a novel approach to compound decomposition provided by the present invention. Second, the set of substrings based on the probabilistic breakpoint analysis is traversed in order of decreasing probability (i.e., with the most probable substrings considered first), in a novel method of probabilistic breakpoint traversal provided by the present invention, with any substrings that are linkable components (e.g., words or linking morphemes) being identified by means of access to a lexicon. In the present invention, lexicon access is therefore independent of lexicon structure, thus allowing the choice of lexicon structure to be based on criteria external to the compound-segmentation process. Third, during the course of the probabilistic breakpoint traversal, the compound is segmented by spanning it by the linkable components thus obtained. A novel approach to segmentation, based on bidirectional chart parsing, is provided by the present invention.

Furthermore, in the case that a segmentation cannot be obtained by the above steps, it would be desirable for the segmentation method to be able to hypothesize at least one possible segmentation of the word to be subjected to further analysis. The adaptation of bidirectional chart parsing to compound-word segmentation provided by the present invention has the advantage of preserving the hypotheses generated during the segmentation process so that, in the case that a complete segmentation cannot be obtained, the chart can be "mined" for partial segmentations that may prove to be useful in the further analysis of the word.

As noted above, an analysis of a corpus of German texts containing approximately five million words yielded almost 60,000 different words at least 15 letters long (out of a vocabulary of approximately 230,000 words), only about 10,000 of which were found in a 503,000-entry German dictionary. A natural-language processing system that relied only on such a dictionary to identify words in this text would therefore be likely to recognize less than 20% of these words. The present invention, however, when tested on this same set of words achieved a recognition rate of over 92%. The present invention is able to realize this advantage because of its focus on a bottom-up, statistical approach to compound-word segmentation based on probabilistic breakpoint traversal.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 2 is a schematic representation of probabilistic breakpoint analysis according to the method of the present invention;

FIG. 3 is a schematic representation of probabilistic segmentation according to the method of the present invention;

FIG. 4 illustrates a computer program screen display showing probabilistic breakpoint analysis according to the method of the present invention;

FIG. 6 illustrates a computer program screen display of compound-word segmentation using a method according to the present invention;

FIG. 8 is a schematic representation of a breakpoint-list structure according to an embodiment of the present invention;

FIG. 9 illustrates a computer program screen display showing compound-word segmentation augmented with chart mining using a method according to the present invention;

DETAILED DESCRIPTION OF THE PREFERRED EMBODIMENTS

Figure 1:
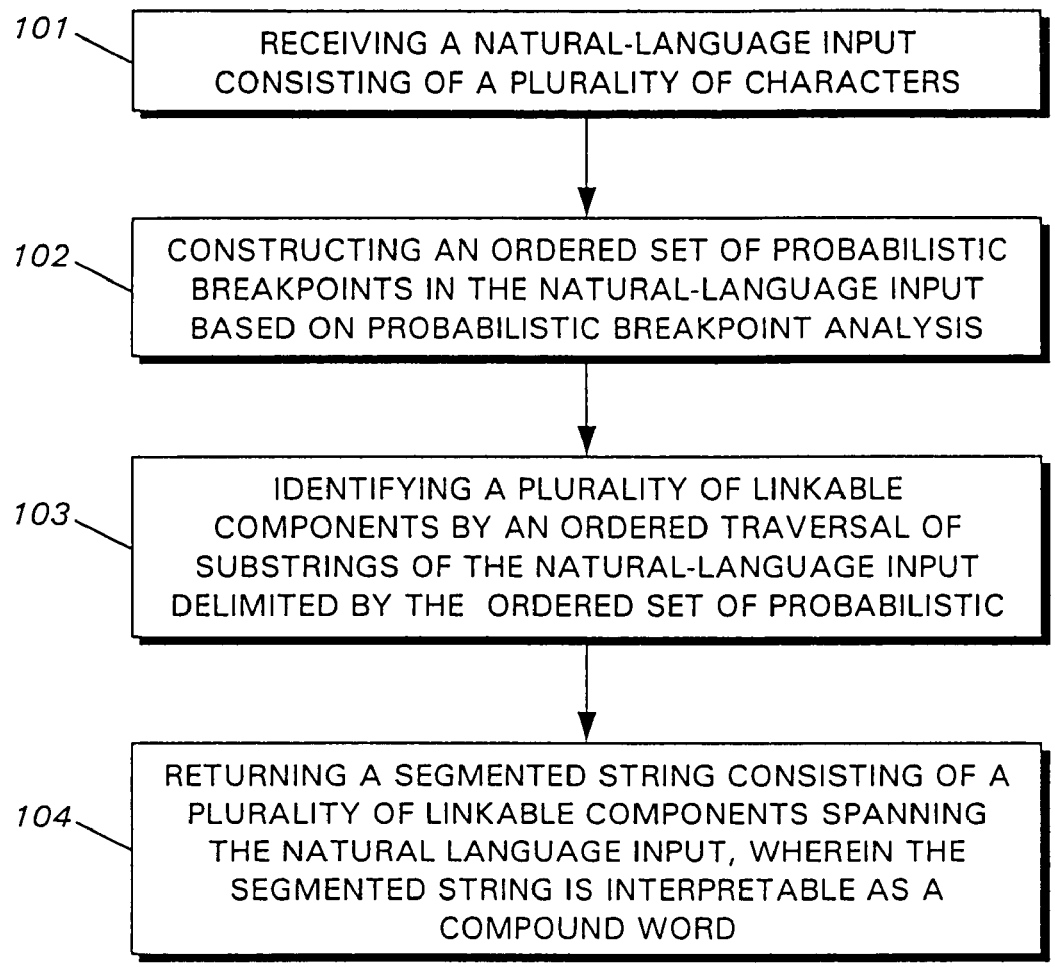
FIG. 1 is a flowchart of steps to efficiently segment compound words using probabilistic breakpoint traversal in accordance with one embodiment of the method of the present invention.

Briefly, the present invention is directed to a linguistic processing method and apparatus for rapidly and accurately segmenting compound words from an unrestricted natural-language input by employing a bottom-up, statistical approach that is independent of dictionary architecture. When discussing the such method and apparatus, the following terms have the following meanings unless otherwise indicated. Additionally, any undefined terms have their ordinary meaning recognized in the art.

bigraph: A sequence of two contiguous characters.

breakpoint: A point between two characters in a word, represented as a vertex in the chart, that may be a point of division in the segmentation of the word.

chart: A data structure, consisting of vertices connected by edges, that encodes hypotheses generated during the course of chart parsing.

chart parsing: A process of generating structure(s) over a given string by means of a grammar.

corpus (plural: corpora): A representative body of text that may be analyzed to yield quantitative information useful in Natural Language Processing (NLP).

compound (word): A word that may be segmented into a plurality of words and linking morphemes (if any) used to combine these words.

digraph: A pair of characters used in a transliteration system to represent a single character in another system; e.g., the digraph "oe" is typically used to represent the character "ö" in the standard transliteration of German.

endpoint (context): In the present invention, an endpoint context is the context to the immediate left of a breakpoint in a word; in the presently preferred embodiment, the endpoint contexts are expressed as trigraphs.

graph: A set of vertices connected by edges. A graph is "connected" if a path exists from any vertex in the graph to any other vertex in the graph. A graph is "acyclic" if every path in the graph has the property that any vertex in graph can occur in the path at most once. A graph is "directed" if every edge is oriented such that it can be traversed in only one direction (i.e., from its starting vertex to its ending vertex). The "graph" and "chart" entities referred to the present invention are directed acyclic graphs.

linking morpheme: A morpheme (e.g., in German, "e", "n", "s", and "er") that may be inserted between two words during the process of compound formation. For example, in German, the two words Abschreibung and Möglichkeiten may be combined to form the compound Abschreibungsmöglichkeiten; the letter "s" that was inserted between these two words by this process is a linking morpheme (note that *Abschreibungmöglichkeiten is not an acceptable German word).

n-graph: A sequence of n contiguous characters; e.g., a trigraph is an n-graph with n=3.

NL ("natural language"): A language, such as German, that is not artificially constructed (as are, for example, computer languages) and which is consequently characterized by features such as ambiguity, polysemy, etc., that present difficulties for algorithmic analysis.

NLP ("natural-language processing"): The automated processing of NL texts or utterances.

segmentation: The process of subdividing a compound word into its constituent words and linking morphemes (if any) used to combine these words.

startpoint (context): In the present invention, a startpoint context is the context to the immediate right of a breakpoint in a word; in the presently preferred embodiment, the startpoint contexts are expressed as trigraphs.

trie: A tree-based data structure typically used in retrieval applications (hence the name, which is derived from "retrieval"); referred to as a "TRIE" in Visser '834.

tetragraph: A sequence of four contiguous characters.

trigraph: A sequence of three contiguous characters.

unigraph: A single character, considered independent of any surrounding context.

word: In the present invention, a "word" is defined as a character string stored in the lexicon, or algorithmically derivable from such a character string.

Referring now to the drawings wherein the showings are for purposes of illustrating preferred embodiments of the present invention only, and not for purposes of limiting the same, FIG. 1 illustrates a method of efficiently segmenting compound words, according to a preferred embodiment of the present invention. The method begins at step 101 with an input of natural language being received by the system. The natural-language input of step 101 may consist of text (e.g., characters or symbols representing human language) entered by a user or received from another source. The natural-language input of step 101 may be entered, or received, in a number of ways. For instance, the natural-language input of step 101 may be entered by a user typing letters into a keyboard, or entering characters or symbols using an input/output (I/O) device such as a mouse or other like I/O device. The natural-language input of step 101 may also be received from a speech recognition system which produces text corresponding to spoken speech, or may be received from a document scanner which converts images sensed from written documents, for instance, into text. The natural-language input may also be in the form of a graph of characters representing ambiguous input; such graphs are typically generated by speech recognizers or document scanners as a response to imperfectly perceived input. The natural-language input may also be text received in the form of a transmitted signal or an encoded signal retrieved from an electronically stored file, such as a computer file. The natural-language input of step 101 may be formatted according to a standard such as ASCII, or a higher level text format such as the Rich Text Format (RTF), or the like.

Depending upon the communication forum in which the present invention is being used, the natural-language input of step 101 may or may not be in the form of unambiguously specified words. In a preferred embodiment of the invention, the natural-language input of step 101 is entered in the form of unambiguously specified words. One example of a communication forum using unambiguously specified word input in step 101 occurs when the natural-language input is derived from a written composition (e.g., a technical paper, a magazine article, a book, a correspondence, or the like). For these types of input, the natural-language input will typically be in the form of unambiguously specified words delimited by white space and/or punctuation marks.

According to an alternative embodiment of the present invention, the natural-language input of step 101 may be entered in ambiguously specified word form. That is, the input of step 101 may not necessarily conform to unambiguously specified words. Examples of a communication forum using ambiguously specified words as natural-language input in step 101 may occur when the input is derived from spoken words or from text perceived by a document scanner. In such input contexts, the natural-language input of step 101 is likely to consist of graphs of characters in which paths through the graphs represent hypothesized words. Use of the present invention in these less well-defined communication forums may result in higher uncertainties in segmenting the compound words in the natural-language input.

Regardless of whether the natural-language input of step 101 is in the form of unambiguously specified words or ambiguously specified words, the entered text is treated at its lowest level of graphical divisibility, characters, for further processing. Characters are the symbols (letters, punctuation marks, etc.) which make up the natural-language input. For ease of description, the present invention is delineated in terms of "letters" being characters which include both letters and punctuation marks. In addition, the present invention is delineated in terms of "compounds" being processed—even though the natural-language input being processed may not be in the form of recognizable compound words. One advantage of the present invention is its capability to partially segment ill-formed and/or ambiguously specified natural-language input.

Additionally, in the presently preferred embodiment of the present invention, the standard transliteration of the German letters "ä", "ö", "ü", and "β" into the digraphs "ae", "oe", "ue", and "ss" is used. This ensures that the present invention is as independent as possible of system- or language-specific encoding effects. The present invention, however, does not require usage of the standard transliteration, and will be likely to exhibit improved behavior if digraphs are not used because the substitution of a digraph for a single letter, as is done in the standard transliteration system, results in a reduction of usable trigraph context. Additionally, depending on which character-encoding conventions are used by a particular embodiment of the invention, ligatures (e.g., "fi" for the digraph "fi") may also be used. It is expected that adapting the present invention from the standard transliteration to a specific transliteration based on a larger character set will improve the invention's accuracy and convergence, because this adaptation will improve the resolution of the trigraphs on which the breakpoint analysis is based, as will be further explained below.

In step 102, an ordered set of probabilistic breakpoints is constructed in the natural-language input based on probabilistic breakpoint analysis. As discussed above, the prior-art methods that attempt to segment a German compound via "top down" analysis (e.g., by attempting to analyze its syllable structure or trying to recursively match it against a trie) are insufficient. Thus the present invention takes a "bottom up" approach to this problem as follows.

Referring to FIG. 2 presents a schematic representation of probabilistic breakpoint analysis (110) is presented. In FIG. 2, the natural-language input is conceptualized as a graph of edges and vertices, where each edge is labeled by a character in the natural-language input and each vertex represents a breakpoint between adjacent characters in the natural-language input. Additionally, each vertex in the graph (representing a breakpoint) is labeled by a number from 0 to L, where L is the length of the natural-language input. Thus, for example, an edge (111) in FIG. 2 is labeled by a edge label "s" 112 and connects a vertex labeled "13" 113 to a vertex labeled "14" 114. The segmentation of natural-language input into a compound word may therefore be represented as a vector of integers (where each integer corresponds to the label of a vertex identifying one of the breakpoints used to segment the compound word). For example, the segmentation Abhaengigkeit+s+verhaeltnis of the compound word Abhaengigkeitsverhaeltnis would be represented as (13, 14), indicating that this compound word is split into three segments by dividing it at the breakpoints corresponding to the vertices labeled 13 and 14, respectively.

Breakpoint weights are assigned to the breakpoints in the natural-language input based on an analysis of n-graphs drawn from an appropriate lexicon. In the presently preferred embodiment of the present invention, the n-graph value used is n=3, though other values (or combinations of values) may be used, as discussed below. The probability of a particular breakpoint may be estimated as the sum of two weights that respectively represent: (1) the probability that the n-graph preceding the breakpoint ends a word and (2) the probability that the n-graph following the breakpoint starts a word. For example, the breakpoint corresponding to vertex "8" 117 in FIG. 2 will have assigned to it a breakpoint weight $W_8$ 118. In the presently preferred embodiment, the breakpoint weight will be determined based on the endpoint context and startpoint context of the breakpoint; i.e., the trigraphs that respectively end a hypothesized word to the left of the breakpoint and start a hypothesized word to the right of the breakpoint. In the example, the endpoint context is the trigraph "ngi" 115 that immediately precedes vertex "8" 117 and the startpoint context is the trigraph "gke" 116 that immediately follows vertex "8" 117. As is discussed further in conjunction with FIG. 5 below, the breakpoint weight $W_8$ 118 is relatively low, indicating that a segmentation of this natural-language input at vertex "8" is not likely.

In the presently preferred embodiment of the present invention, the weighting of probabilistic breakpoints is accomplished by calculating the weights W of the trigraph contexts that precede and follow the breakpoint; i.e., $$W(b_j(v_i)) = F_e(c_{(i-2,i)}) + F_s(c_{(i+1,i+3)}) \quad (1)$$

where:

1) $b_j$ is the breakpoint corresponding to the vertex $v_i$ (i.e., the vertex that follows the $i^{th}$ character in the natural-language input).

2) $c_{(m,n)}$ (where m<n) represents the sequence of (n−m)+1 characters in the natural-language input from character m to character n.

3) The function $F_e$ returns the number of times that its argument occurs as a word-initial substring in a predetermined lexicon. In the presently preferred embodiment, the argument is a trigraph of three contiguous characters.

4) The function $F_s$ returns the number of times that its argument occurs as a word-final substring in a predetermined lexicon. In the presently preferred embodiment, the argument is a trigraph of three contiguous characters.

In addition to trigraph context, alternative embodiments of the present invention might calculate the weight of a probabilistic breakpoint as follows:

1) Bigraph context; i.e., $W(b_j(v_i))=F_e(c_{(i-1,i)})+F_s(c_{(i+1,i+2)})$. Experimentation has indicated that using bigraph context results in lower accuracy than trigraph context; however, bigraph context requires much smaller breakpoint probability matrices.

2) Tetragraph context; i.e., $W(b_j(v_i))=F_e(c_{(i-3,i)})+F_s(c_{(i+1,i+4)})$. Tetragraph context involves more context than trigraph context, however it also requires substantially larger breakpoint probability matrices.

3) Asymmetrical context; i.e., $W(b_j(v_i))=F_e(c_{(i-m,i)})+F_s(c_{(i+1,i+n)})$, where m≠n−1. The previous formulas all have the characteristic that the context considered on either side of the breakpoint is of the same length (e.g., trigraphs), however it is possible that other choices of context may be sufficient; e.g., the bigraph preceding the breakpoint combined with the trigraph following the breakpoint, etc.

4) Weighted context; e.g., $W(b_j(v_i))=\lambda_{-2}F_e(c_{(i-2,i)})+\lambda_{-1}F_s(c_{(i-1,i)})+\lambda_2 F_s(c_{(i+1,i+2)})+\lambda_3 F_s(c_{(i+1,i+3)})$. In this case, multiple contexts are taken into account, with their contribution to the weight of the probabilistic breakpoint determined by the value of the associated constant $\lambda_i$. For the given formula both trigraph and bigraph contexts are taken into account with, for example, the contribution of the preceding trigraph context being determined by the value of $\lambda_{-2}$.

To summarize, all of the above approaches may be combined into the following equation:

$$W(b_j(v_i)) = \sum_{j=1}^{m} \lambda_{-j} F_e(c_{(i-j,i)}) + \sum_{k=1}^{n} \lambda_k F_s(c_{(i+1,i+k)}) \quad (2)$$

with the appropriate values of the variables m and n, and the sequence $\{\lambda_{-m}, \ldots, \lambda_n\}$ for each of the above cases being as follows:

1) For the symmetrical bigraph context case, m=1, n=2, and $\{\lambda_{-m}, \ldots, \lambda_n\}=\{\lambda_{-1}, \ldots, \lambda_2\}=\{1, 0, 0, 1\}$.

2) For the symmetrical tetragraph context case, m=3, n=4, and $\{\lambda_{-m}, \ldots, \lambda_n\}=\{\lambda_{-3}, \ldots, \lambda_n\}=\{1, 0, 0, 0, 0, 0, 0, 1\}$.

3) For the asymmetrical context case, if (for example), m=1, and n=3 (note that m≠n−1), then $\{\lambda_{-m}, \ldots, \lambda_n\}=\{\lambda_{-1}, \ldots, \lambda_3\}=\{1, 0, 0, 0, 1\}$.

4) For the weighted context case, if (for example), $W(b_j(v_i))=\lambda_{-2}F_e(c_{(i-2,i)})+\lambda_{-1}F(c_{(i-1,i)})+\lambda_2 F(c_{(i+1,i+2)})+\lambda_3 F(c_{(i+1,i+3)})$ then m=2 and n=3, and $\{\lambda_{-m}, \ldots, \lambda_n\}=\{\lambda_{-1}, \ldots, \lambda_3\}=\{\lambda_{-2}, \lambda_{-1}, 0, 0, \lambda_2, \lambda_3\}$.

5) For the symmetrical trigraph case (as implemented in the presently preferred embodiment): m=2, n=3, and $\{\lambda_{-m}, \ldots, \lambda_n\}=\{\lambda_{-2}, \ldots, \lambda_3\}=\{1, 0, 0, 0, 0, 1\}$.

Thus breakpoint weights are assigned to each breakpoint based on a quantitative analysis of the lexicon, resulting in an ordering of the set of breakpoints according to the probability of a segmentation of the natural-language input occurring at each breakpoint in the set. For example, if the breakpoint at vertex "14" (114) is determined to be the most probable breakpoint in the natural-language input, and the breakpoint at vertex "15" is determined to be the next most probable, then the former is identified as the "first breakpoint" ("$b_1$," or "breakpoint 1") and the latter as the "second breakpoint" ("$b_2$," or "breakpoint 2"), etc. Note that "vertex 1" (for example) refers to a fixed position in the chart (specifically corresponding to the breakpoint that follows the first character of the natural-language input) while "breakpoint 1" refers to a chart position that depends on the weights assigned to all of the breakpoints in the natural-language input (and, in the above example, corresponds to vertex "14" (114)).

Referring back to FIG. 1, in step 103, a plurality of linkable components is identified by a probabilistic breakpoint traversal; i.e., an ordered traversal of substrings of the natural-language input delimited by the probabilistic breakpoints. The ordered traversal is accomplished by iteratively splitting the natural-language input into substrings delimited by the probabilistic breakpoints. During the probabilistic breakpoint traversal, a substring may be identified as a linkable component (e.g., by locating it in a lexicon). Thus lexicon access is independent of lexicon structure in the present invention, which therefore permits a choice of lexicon structure to be based on criteria external to the compound-segmentation process. Also, as further discussed below, the assignment of breakpoint weights to the breakpoints permits ordering the substrings according to breakpoint probability. Thus an ordered set of substrings is constructed which has the desirable property that the substrings in the natural-language input that are most likely to be linkable components are ordered early in the ordered set of substrings, allowing rapid convergence to a segmentation of the natural-language input.

The probabilistic breakpoint traversal method of the present invention is formalized as follows. Given a natural-language input ω of length L, the breakpoint set $S(b_n)$ corresponding to the $n^{th}$ breakpoint in ω (which is symbolized as $b_n$ and which corresponds to some vertex k (0<k<L) in ω) is generated as follows:

1) Generate the substring corresponding to the characters of ω from vertex 0 to vertex k and add it to $S(b_n)$.
2) Generate the substring corresponding to the characters of ω from vertex k to vertex L and add it to $S(b_n)$.
3) If n>1, then for each vertex $v_i$ corresponding to the breakpoint $b_i$ (0<i<n−1), do the following:
   a) If $v_i$<k, then generate the substring corresponding to the characters of ω from $v_i$ to k and add it to $S(b_n)$.
   b) If $v_i$>k, then generate the substring corresponding to the characters of ω from k to $v_i$ and add it to $S(b_n)$.

It now must be proved that the breakpoint sets generated by the above procedure are all disjoint. This will ensure that the union of these sets exactly covers the set of proper substrings of ω, so that the traversal of the set of breakpoint sets will neither fail to consider any possible linkable components in ω nor test any substring more than once.

This proof is accomplished as follows. Choose any two breakpoint sets derived from ω; i.e., $S(b_m)$ and $S(b_n)$, where m≠n and where the breakpoint $b_m$ corresponds to the vertex v and the breakpoint $b_n$ corresponds to the vertex $v_k$. Because m≠n then the corresponding vertices ($v_j$ and $v_k$) are also not equal. However, a property of a breakpoint set $S(b_i)$ (where the breakpoint $b_i$ corresponds to some vertex $v_j$) is that every string in it must either start or end on the corresponding vertex $v_j$. Thus no string in $S(b_m)$ can be equal (i.e., have the same starting vertex, ending vertex, and characters) to any string in $S(b_n)$, and all the breakpoint sets derived from ω are therefore disjoint.

Because the breakpoint sets derived from ω are disjoint, it follows that the set of breakpoint sets covers the set of proper substrings of ω. This is because the elements of the set of breakpoint sets are all proper substrings of ω and the two sets have the same cardinality (if two sets consist of the same elements and have the same cardinality, then they are by definition equal). The latter property follows from the fact that the cardinality of a breakpoint set $S(b_i)$ is i+1, and that there are L−1 vertices in ω that can generate breakpoint sets; thus the cardinality of the set of breakpoint sets is $$\sum_{i=1}^{L-1}(i+1),$$

which is equivalent to $$\sum_{i=2}^{L}i,$$

which is the cardinality of the set of proper substrings of a string of length L.

The implementation of the above method may be improved by using "filters" and "accelerators," described as follows. A filter is a method for determining that a substring can be removed from consideration by the segmentation method before accessing the lexicon; this speeds up the method to the extent that the tests involved are less costly than lexicon accesses. An accelerator, on the other hand, is an alteration to the breakpoint weighting function that takes into consideration additional information concerning the natural-language input (besides startpoint and endpoint context) with the result that certain breakpoints are made more probable (moving them higher in the breakpoint list and thus accelerating convergence to a segmentation).

In the presently preferred embodiment of the present invention, the number of substrings that need to be looked up in the lexicon is substantially reduced by the application of four filters, as follows:

1) Length restriction: This filter eliminates any substrings, excluding linking morphemes, that are too short to be a linkable component in a German compound. In the presently preferred embodiment, the length restriction is set to 3 (i.e., a substring must be at least 3 characters long to be looked up in the lexicon).
2) Edge restriction: Given a length restriction of N, this additional filter can be used to eliminate from consideration all substrings generated by the breakpoints at vertices 1 through N and L−N through L−1 (where L is the length of the natural-language input under consideration).
3) Final trigraph restriction: This filter takes advantage of the information stored in the breakpoint probability matrices (which are used to order breakpoints by probability, as discussed above); if the final three characters of the substring correspond to a zero entry in the endpoint probability matrix, then the substring is guaranteed not to occur in the lexicon, so it need not be looked up. (In the presently preferred embodiment, the final trigraph restriction is applied before the initial trigraph restriction because there are fewer different trigraphs in the endpoint probability matrix than in the startpoint probability matrix, indicating a more restricted distribution of final trigraphs in German words, as is to be expected from the inflectional character of the language.)
4) Initial trigraph restriction: Similarly, if the first three characters of the substring correspond to an zero entry in the startpoint probability matrix, then the string is also guaranteed not to occur in the lexicon, so it need not be looked up.

In the presently preferred embodiment of the present invention, two accelerators are used to increase convergence, as follows.

The first accelerator takes advantage of word-internal capitalization. In German, word-internal capitalization is a useful means of increasing the convergence of the segmentation method. This was because some compounds often have the first letter of some of their constituent words capitalized (e.g., Identität+s+konsens+symbolik could be actually written as "IdentitätsKonsenssymbolik"). Thus, if the weight corresponding to each trigraph which started with a capital letter (e.g., "kon" in the above example) were to be increased by a fixed amount, the preceding breakpoint would be made more probable and thus might result in a more rapid segmentation of the compound.

The second accelerator involves the early identification of possible linking morphemes. As noted above, German compounding often involves the insertion of linking morphemes between the words to be compounded. For example, to form a compound from the two words Abschreibung and moeglichkeiten requires the insertion of the linking morpheme "s" between them, thus resulting in the compound Abschreibung smoeglichkeiten (not *Abschreibungmoeglichkeiten). Unfortunately, this has the effect of diluting what would have been a strongly weighted breakpoint ("ung+moe", with a weight of 8,816+278=9,094) into two weaker ones ("ung+smo", with a weight of 8,816+16=8,832, and "ngs+moe", with a weight of 426+278=700). In the latter case, the resulting breakpoints are first and sixth, meaning that the correct segmentation will not be obtained until six breakpoints have been tested. This dilution can be addressed by adding to the weights of the breakpoints on either side of a linking morpheme an amount proportional what the weight of the breakpoint would have been had the linking morpheme not been there. However, because of the high frequency of the letters "e", "n", and "s" in German, this approach has the potential drawback of skewing the breakpoint distribution. Thus in the presently preferred embodiment, the breakpoint weight modification described above is applied only to the letter "s" (which is the most frequently used linking morpheme).

Referring back to FIG. 1, in step 104, a segmented string that is interpretable as a compound word constructed from a plurality of linkable components spanning the natural-language input is returned. FIGS. 3 through 7 demonstrate the method of the present invention as applied to an exemplary German word Abhaengigkeitsverhaeltnis in order to yield its segmentation Abhaengigkeit+s+verhaeltnis. Because this word is 25 characters long, and because breakpoint probabilities in the presently preferred embodiment of the present invention are determined according to trigraph context, 20 breakpoints are considered, starting at the third vertex (between the third and fourth characters in the word) and ending at the $22^{nd}$ vertex (between the $22^{nd}$ and $23^{rd}$ characters). Each of the two trigraphs adjacent to each breakpoint (i.e., its startpoint context and its endpoint context, as defined above in conjunction with FIG. 2) receives a weight based on an analysis of a lexicon of German words, and the weight of the breakpoint is calculated as the sum of the two trigraph weights, as discussed above in conjunction with step 102 of FIG. 1. Thus the breakpoint at vertex 3 receives the weight 103 because the trigraph "aen" (its startpoint context) is attested as starting 103 words in the lexicon, while the trigraph "abh" (its endpoint context) is not attested as ending any words in the lexicon. Similarly, the breakpoint at vertex 14 receives the weight 31,845 because the trigraph "its" (its endpoint context) is attested as ending 123 words in the lexicon and the trigraph "ver" (its startpoint context) is attested as starting 31,722 words in the lexicon.

The bold numerals at the far right of FIG. 3 indicate the order in which the breakpoints will be traversed during the course of the probabilistic breakpoint traversal. This traversal will result in the incremental generation of the following 20 substrings as possible linkable components (these substrings are grouped below by "breakpoint set n"; i.e., "breakpoint set n" is the set of n+1 strings that is generated by the $n^{th}$ breakpoint) to be tested against the lexicon:

1) "Abhaengigkeits" and "verhaeltnis".
2) "Abhaengigkeit" and "sverhaeltnis", plus "s" (from the first breakpoint; because this is a single character, it is automatically excluded from lexicon lookup by the "length restriction" (discussed above in conjunction with step 103 of FIG. 1); the fact that it also happens to be a linking morpheme is taken care of by the "seeding" of the chart as discussed below in conjunction with FIG. 6).
3) "Abhaengigkeitsverhaelt" and "nis", plus "verhaelt" (from the first breakpoint) and "sverhaelt" (from the second breakpoint).
4) "Abhaengigkeitsver" and "haeltnis", plus "ver" (from the first breakpoint), "sver" (from the second breakpoint), and "haelt" (from the third breakpoint).
5) "Abhaengigkeitsv" and "erhaeltnis", plus "v" (from the first breakpoint; as noted above, this single character will also not be looked up), "sv" (not looked up), "erhaelt" (from the third breakpoint), and "er" (from the fourth breakpoint).

FIG. 4 presents a schematic representation of probabilistic segmentation 120, according to the method of the present invention. The six German words (Abhaengigkeit, abhaengig, haengig, verhaeltnis, erhaelt, and haelt) that occur in the first five breakpoint sets discussed above are shown as labeled edges connecting the corresponding vertices in FIG. 4, along with a seventh edge labeled "er" 121 that represents a possible linking morpheme (as discussed below in conjunction with FIG. 6); note that the combination of this linking morpheme with the word "haelt" 122 will result in a new linkable component, labeled "er+haelt" 123, which spans both of these edges. The order in which these words are considered by the probabilistic breakpoint traversal method of the present invention is governed by the ordering of the breakpoints that delimit them, as shown in Table 1.

TABLE 1

| Starting Vertex | Ending Vertex | Starting Vertex Breakpoint | Ending Vertex Breakpoint | Higher Breakpoint | Word |
|---|---|---|---|---|---|
| 14 | 25 | 1 | 0 | 1 | verhaeltnis |
| 0 | 13 | 0 | 2 | 2 | Abhaengigkeit |
| 17 | 22 | 4 | 3 | 4 | haelt |
| 15 | 22 | 5 | 3 | 5 | erhaelt |
| 0 | 9 | 0 | 7 | 7 | abhaengig |
| 2 | 9 | X | 7 | X | haengig |

In Table 1, the first two columns list the starting and ending vertex, respectively, of the word in the sixth column. The third and fourth columns list the breakpoints that respectively correspond to these vertices (with the first and last vertices in the chart corresponding to the "zeroth" breakpoint, and the character "X" used to indicate that the breakpoint corresponding to the vertex in question hasn't been scored because of the edge restriction), and the fifth column lists the higher valued of the two breakpoints in these two columns. Ordering the words by the higher breakpoint indicates in which order they will be considered by the algorithm, and if the higher breakpoint is "X", then they need not be considered at all (since they cannot be used to segment the given word).

Figure 5:
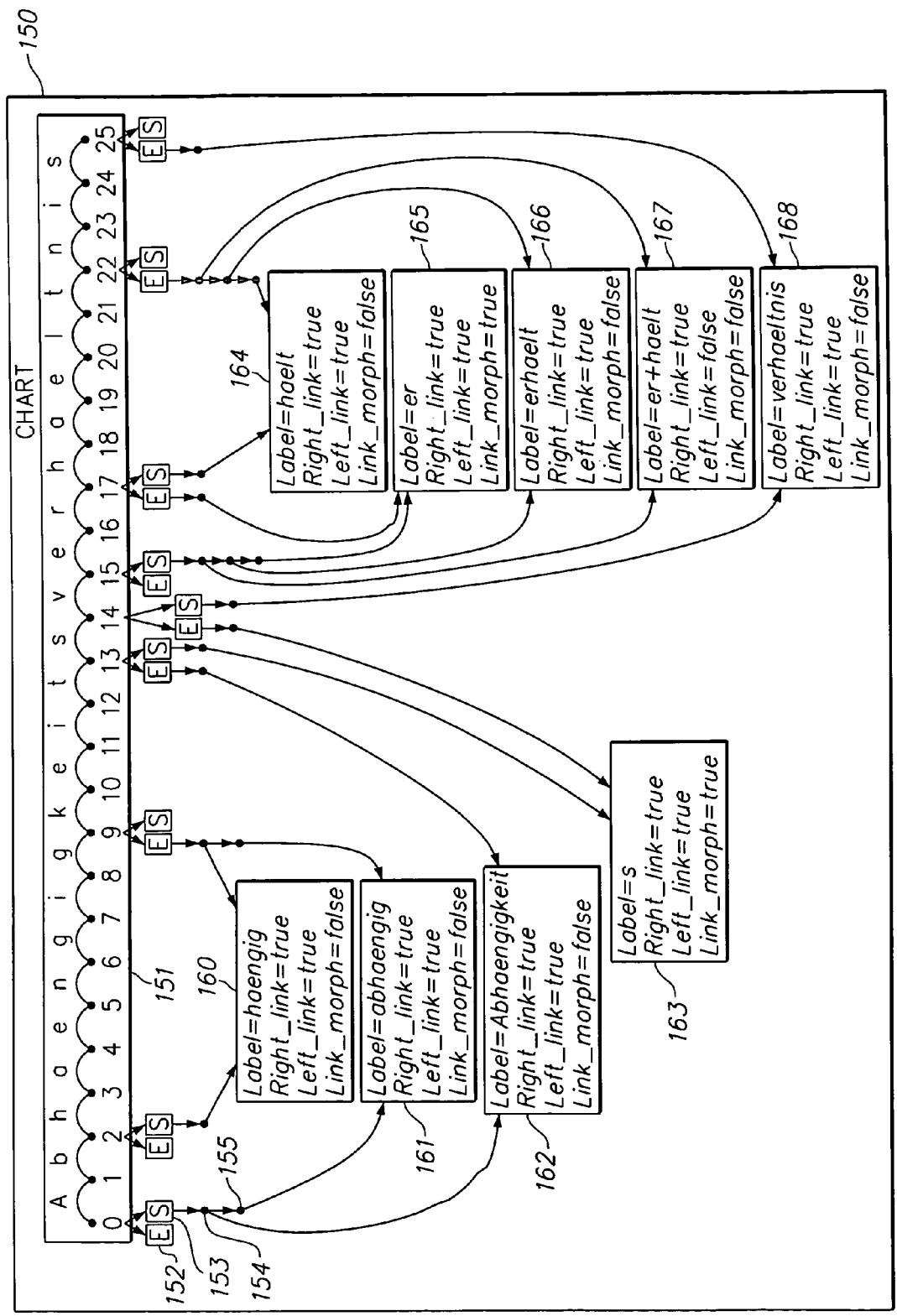
FIG. 5 is a schematic representation of a chart data structure used to encode segmentation progress according to an embodiment of the present invention.

FIG. 5 presents a schematic representation of a chart 150 data structure used by the present invention, the contents of which correspond to the schematic representation of probabilistic segmentation 120 presented in FIG. 4. Each labeled edge in FIG. 4 corresponds to an edge object in FIG. 5 (for example, the edge labeled "er+haelt" 123 in FIG. 4 corresponds to the edge object labeled "er+haelt" 167 in FIG. 5), with each edge object schematically represented as discussed below. Because each vertex in the chart can serve as both an ending point and a starting point of at least one edge (with the exception that no edge can end at the first vertex of the chart and no edge can start at the last vertex of the chart), each vertex is provided with two linked-list heads, labeled "E" and "S", for "ending" and "starting" respectively. For clarity, the pair of linked-list heads corresponding to a given vertex in FIG. 5 is shown only if at least one of the associated linked lists of edges is not null. For example, the edge-ending linked-list head for vertex "0" 152 and the edge-starting linked-list head for vertex "0" 153 are shown in FIG. 5 because the latter contains two nodes 154, 155, which respectively point to an edge object labeled "abhaengig" 161 and an edge object labeled "Abhaengigkeit" 162.

FIG. 6 presents a computer program screen display that demonstrates how a presently preferred embodiment of the present invention properly segments the exemplary German compound Abhaengigkeitsverhaeltnis after considering the first two breakpoints only; i.e., processing the first breakpoint results in the identification of the compound's second word (verhaeltnis) and processing the second breakpoint results in the identification of the compound's first word (Abhaengigkeit). The proper linking together of these two words (by means of the linking morpheme "s") is discussed above in conjunction with step 103 of FIG. 1. This result demonstrates the efficiency of the presently preferred embodiment, which converges rapidly to the correct solution; however, FIG. 6 also demonstrates another advantage of the present invention, which is that, even if the correct segmentation had not been determined so rapidly, the number of substrings that need to be looked up in the lexicon can be substantially reduced by the four filters discussed above in conjunction with step 103 of FIG. 1.

As can be seen in Table 2, out of the 20 substrings generated by analyzing the exemplary German compound Abhaengigkeitsverhaeltnis down to its fifth probabilistic breakpoint, only 15 of them (75%) actually need to be looked up in the German lexicon because four substrings are blocked by the length restriction and one is blocked by the final trigraph restriction. Of the 15 substrings that remain, six (Abhaengigkeit, abhaengig, haengig, verhaeltnis, erhaelt, and haelt) are actual German words, and are marked "Found" in the table.

TABLE 2

| Break-point | Position | Word | Result |
| --- | --- | --- | --- |
| 1 | L | Abhaengigkeits | Looked up: Not in Lexicon |
|   | R | Verhaeltnis | Looked up: Found |
| 2 | L | Abhaengigkeit | Looked up: Found |
|   | R | Sverhaeltnis | Looked up: Not in Lexicon |
|   | 1 | s | Blocked (length restriction) |
| 3 | L | Abhaengigkeitsverhaelt | Looked up: Not in Lexicon |
|   | R | Nis | Looked up: Not in Lexicon |
|   | 1 | Verhaelt | Looked up: Not in Lexicon |
|   | 2 | sverhaelt | Looked up: Not in Lexicon |
| 4 | L | Abhaengigkeitsver | Looked up: Not in Lexicon |
|   | R | haeltnis | Looked up: Found |
|   | 1 | Ver | Looked up: Not in Lexicon |
|   | 2 | sver | Looked up: Not in Lexicon |
|   | 3 | haelt | Looked up: Found |
| 5 | L | Abhaengigkeitsv | Blocked (final trigraph restriction) |
|   | R | erhaeltnis | Looked up: Not in Lexicon |
|   | 1 | V | Blocked (length restriction) |
|   | 2 | Sv | Blocked (length restriction) |
|   | 3 | erhaelt | Looked up: Found |
|   | 4 | Er | Blocked (length restriction) |

As noted above, FIG. 6 presents a computer screen display demonstrating the segmentation of the exemplary German compound Abhaengigkeitsverhaeltnis in accordance with the method of the present on. The final state of the chart is shown at the bottom of FIG. 6, and is interpreted as follows. The first line (labeled "A") contains the natural-language input, followed by the number of edge objects that were in the chart when the segmentation was completed. The last line (labeled "B") consists of a reference scale that contains the final digit of each ending vertex (of the edge labeled by the corresponding character in the first line) in the chart. The intervening lines (labeled "C") each contain a representation of one edge in the chart; e.g., the first line represents the edge labeled "e" that starts at vertex 4 in the chart and ends at vertex 5. This information is also shown on the right half of the line, which contains an ordered pair of integers indicating the start and end vertices, the label of the edge, the edge's serial number, and a pair of inkability flags "<αLL, αRR>", where a is either "+" or "−", whose meaning is discussed below.

The segmentation of the German compound Abhaengigkeitsverhaeltnis in accordance with the method of the present invention proceeds as follows. First, the chart is initialized to 26 vertices (the edges which connect adjacent vertices thus corresponding to the 25 characters in the compound, as discussed above in conjunction with step 102 of FIG. 1), and all occurrences (if any) of the linking morphemes "e", "n", "s", and "er" in the compound are seeded into the chart as edges that connect the appropriate vertices (eight of which are inserted, as shown in FIG. 6). As can be seen in the figure, each of these eight edges is annotated as "<+LL, +RL>". This means that the edge is both "left-linkable" and "right-linkable"; i.e., it can be combined with another, adjacent edge on either side to generate a new edge that spans both of them.

After the chart has been seeded with potential linking morphemes, the segmentation method commences at the first breakpoint, which in this case results in the program looking up the substrings "Abhaengigkeits" and "verhaeltnis" in a German lexicon. Since the latter string is found in the lexicon, it is inserted into the chart as the ninth edge of the chart (this edge is both left- and right-linkable because it has not yet combined with any linking morphemes). This insertion triggers the formation of a tenth edge (labeled "s+verhaeltnis"), because "verhaeltnis" can combine with the edge labeled "s" to its left (which was seeded into the chart upon initialization as the fourth edge of the chart). This tenth edge is not left-linkable, since it was formed by the addition of a linking morpheme to the left of an existing (left-linkable) edge.

Since neither of the above edges spans the chart, the algorithm proceeds to the second breakpoint, which results in the program looking up the substrings "Abhaengigkeit" and "sverhaeltnis" in the German lexicon. Since the former substring is found in the lexicon, it is inserted into the chart as the eleventh edge of the chart. This insertion triggers the formation of a twelfth edge (labeled "Abhaengigkeit+s"), since "Abhaengigkeit" can be combined with the edge labeled "s" to its right (which, as noted above, was seeded into the chart upon initialization as its fourth edge). This twelfth edge is not right-linkable, since it was formed by the addition of a linking morpheme to the right of an existing (right-linkable) edge.

The insertion of the eleventh edge into the chart also triggers the formation of a thirteenth edge in the chart (which is labeled "Abhaengigkeit+s+verhaeltnis"), from combination with the tenth edge. Although the tenth edge is flagged as not being left-linkable, the eleventh edge is flagged as being right-linkable, so the thirteenth edge can be formed by combining the tenth edge and the eleventh edge. (The combination of adjacent edges is blocked only if the left-hand edge is flagged as being not right-linkable and the right-hand edge is flagged as being not left-linkable, because this would indicate that both edges have reached their common vertex by means of a linking morpheme, and combining them at that vertex would result in an edge that contained contiguous linking morphemes, which is not permitted in German.)

This thirteenth edge spans the chart, so it is not inserted, but is instead returned by the program as a successful segmentation of the natural-language input Abhaengigkeitsverhaeltnis (as the German compound Abhaengigkeit+s+verhaeltnis). As can be seen in FIG. 6, the convergence result for the processing of this compound was 0.93%, which is the theoretical minimum convergence for this word. The theoretical minimum convergence is calculated as $$\frac{\min(L(w))}{P(w)},$$

where L(w) is the number of lexicon accesses that would be required for a binary splitting algorithm to segment the word w and P(w) is the number of proper substrings in w (i.e., $$\frac{n^2}{2} + \frac{n}{2} - 1,$$

where n is the number of characters in w). Since a binary splitting algorithm would require at least three lexicon accesses to obtain the correct segmentation of Abhaengigkeitsverhaeltnis, and since there are 324 proper substrings in this word, the theoretical minimum convergence for this compound is $$\frac{3}{324},$$

or 0.93%.

Figure 7:
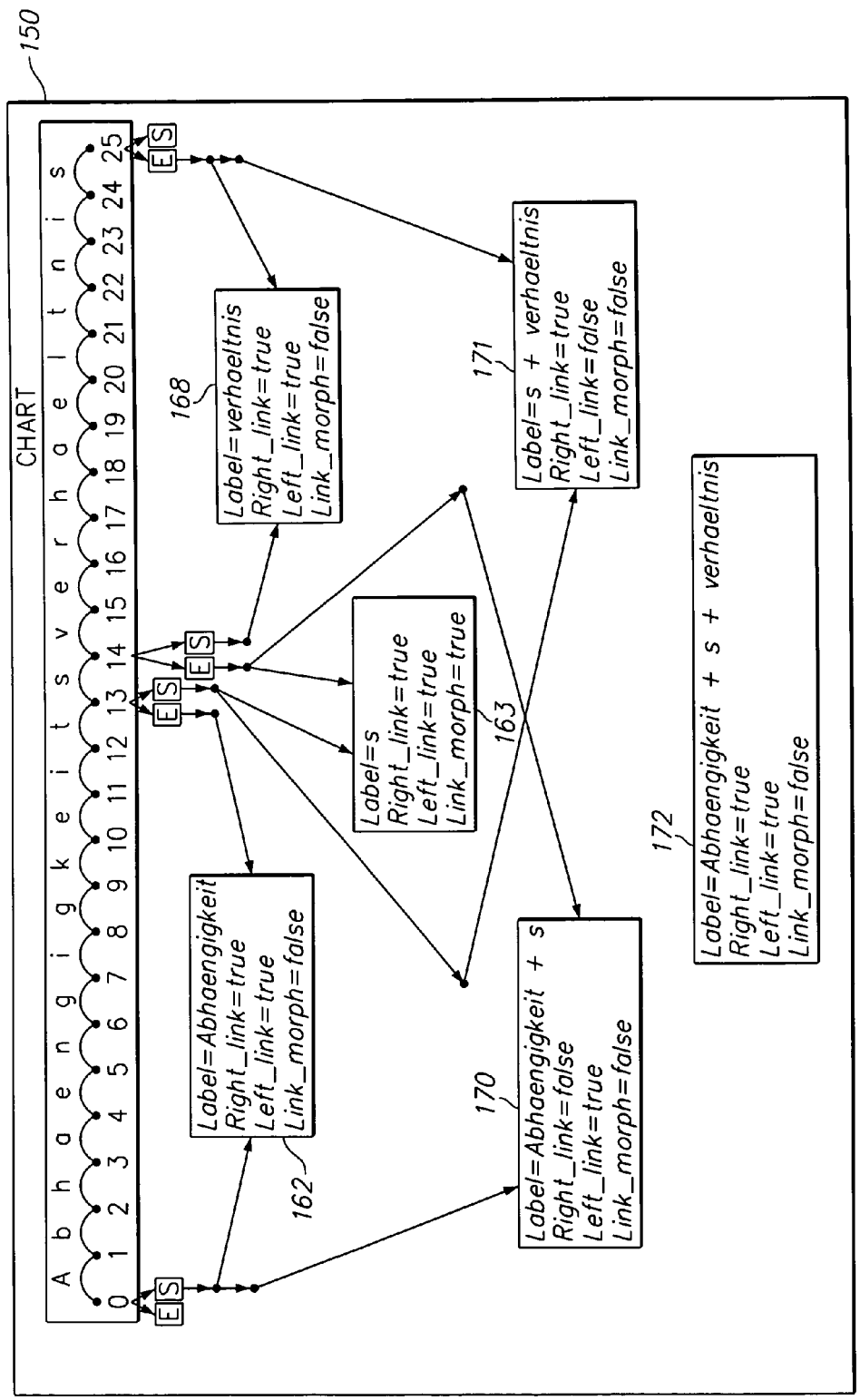
FIG. 7 is a schematic representation of a chart data structure encoding segmentation progress corresponding to the computer program screen display of FIG. 6, according to an embodiment of the present invention.

FIG. 7 presents a schematic representation of the chart 150 data structure used by an embodiment the present invention, the contents of which correspond to the computer program screen display presented in FIG. 6. Comparison with the contents of the chart data structure presented in FIG. 4 confirm the efficiency of the method of the present invention as discussed above. In FIG. 7, all but one of the eight linking-morpheme edges discussed above in conjunction with FIG. 6 have been suppressed for clarity; the single linking-morpheme edge shown is the fourth edge generated, which links vertex 13 with vertex 14 in the chart and is labeled "s" 163. As discussed in conjunction with FIG. 6 above, four additional edges are generated and inserted into the chart after the linking-morpheme edges have been inserted into the chart: the ninth edge 168, the tenth edge 171, the eleventh edge 162, and the twelfth edge 170. Combination of the tenth and eleventh edges 171, 162 yields the thirteenth edge 172, which spans the chart and is therefore not inserted.

FIG. 8 presents a schematic representation of a breakpoint-list structure according to an embodiment of the present invention, using the data presented in FIG. 5 in conjunction with the analysis of the exemplary German compound Abhaengigkeitsverhaeltnis. The three columns on the right-hand side of FIG. 8 correspond to the first, fifth, and sixth columns of FIG. 5, and thus respectively contain the vertex defining a breakpoint, the weight calculated for the breakpoint, and the breakpoint's rank relative to the other breakpoints in the natural-language input. This information is represented in a preferred embodiment of the present invention by means of a sorted list of ordered pairs BPList 180, as shown on the left-hand side of FIG. 8.

Each element of BPList is an ordered pair of the form "(Weight, Vertex)", with the list sorted first in descending order based on the first member of each ordered pair (hence the $n^{th}$ element in the list, which will be stored at location n, will have a weight that is greater than or equal to the weight of any $m^{th}$ element in the list, where m>n), with subsequences of elements having the same weight sorted in ascending order based on the second member of each ordered pair (hence if two elements in the list, corresponding to the vertices m and n, where m>n, have the same weights, then the element corresponding to vertex n will precede the element corresponding to vertex m). Thus the correspondences between elements in BPList and the data shown by FIG. 5 are shown by the bidirectional arrows in FIG. 8; for example, breakpoint 1 (the most-probable breakpoint, which is at vertex 14 and which has a weight of 31,845) is stored as the zeroth element of BPList; breakpoint 2 (the second most-probable breakpoint, which is at vertex 13 and which has a weight of 3,017) is stored as the first element of BPList, etc. In general, the vertex corresponding to the $n^{th}$ breakpoint will be obtained by inspection of the second member of the ordered pair in the $(n-1)^{th}$ element of BPList.

As noted previously, in the case that a plurality of linkable components spanning the natural-language input cannot be obtained by the probabilistic breakpoint traversal method of the present invention, an optional additional process may inspect the results of the traversal and hypothesize one or more possible segmentations of the natural-language input that may then be subjected to further analysis; the chart-based approach used by the present invention is especially amenable to this approach, as discussed below.

FIG. 9 shows the state of the chart after the probabilistic breakpoint traversal method of present invention failed to determine a segmentation for the natural-language input Geschwerkschaftsorganisation. As can be seen in the chart, the following set of eight words was identified: {Werk, schaft, Organisation, Gani, Haft, Anis, Organ, schwer}. Using the German compounding rules and linking morphemes, an additional 15 edges were entered into the chart during the course of the probabilistic breakpoint traversal, as shown in FIG. 9. However, none of these edges completely spanned the chart, so the chart was subsequently mined for a partial segmentation, resulting in the segmented string:

{Gesch}werk+schaft+s+organisation (where the characters in braces indicate the portion of the natural-language input that remains unaccounted for). In the presently preferred embodiment of the present invention, the chart-mining algorithm chooses the longest edge starting at the leftmost vertex of the chart (there was none in this case), and joins it with the longest non-overlapping edge ending at the rightmost vertex of the chart, with any intervening characters left unaccounted for.

As noted above in the discussion of the relevant prior art, chart mining relates to the limitation of breakpoint-based segmentation noted in Bass '571; i.e., "that certain words have forms which are used only when the word is combined with others in compounds" (col. 2, lines 64-66). Compounds exhibiting this behavior fall into two general classes, which are exemplified by the German compounds Schulkinder (from Schule plus Kinder), cited in Bass '571, and Schiffahrt (from Schiffplus Fahrt), cited in Frisch '617. In compounds of the first type, a "combining form" has been created by truncating one of the words (in this case, by removing the final "e" of Schule, resulting in *Schul, which is not a valid word of German), while in compounds of the second type, the compounds "overlap" by sharing a character (in this case, the second "f").

However, because of the large size of the lexicon used by the presently preferred embodiment of the present invention, neither of these classes of compounds poses a problem; e.g., since both Schulkinder and Schiffahrt occur as words in the lexicon, they not only do not need to be explicitly segmented by the algorithm, but also aid in the segmentation of any compounds that contain them; e.g., Grundschulkinder and Schiffahrtskanal (which are therefore segmented as Grund+schulkinder and Schiffahrt+s+kanal, respectively).

In the case that a compound in one of the above two classes does not occur in the lexicon, however, its segmentation may be obtained by chart mining as follows. For words of the first class; if, for example, Schulkinder was not in the lexicon, then mining the chart would result in the string {Schul}kinder. Reference to the lexicon by methods known to the art would then be able to obtain Schule as the closest match for the unassigned characters in this string; the resulting compound would then be represented as Schul(e)+kinder, with the truncated character of the first element of the compound inserted in parentheses. Similarly, for words of the second class; if, for example, Schiffahrt was not in the lexicon, then mining the chart would result in the string Schif[f]ahrt (where the square brackets indicate the overlap of the two words Schiff (from vertex 0 to vertex 6) and Fahrt (from vertex 5 to vertex 10)). Recognition of this overlap would then result in a compound which would be represented as Schiff+(f)ahrt (as noted in Frisch '617, the correct segmentation of this type of compound is important in the processing of German texts; e.g., the proper hyphenation of Schiffahrt is "Schiff-fahrt"; i.e., it requires the restoration of the truncated "f").

Figure 10:
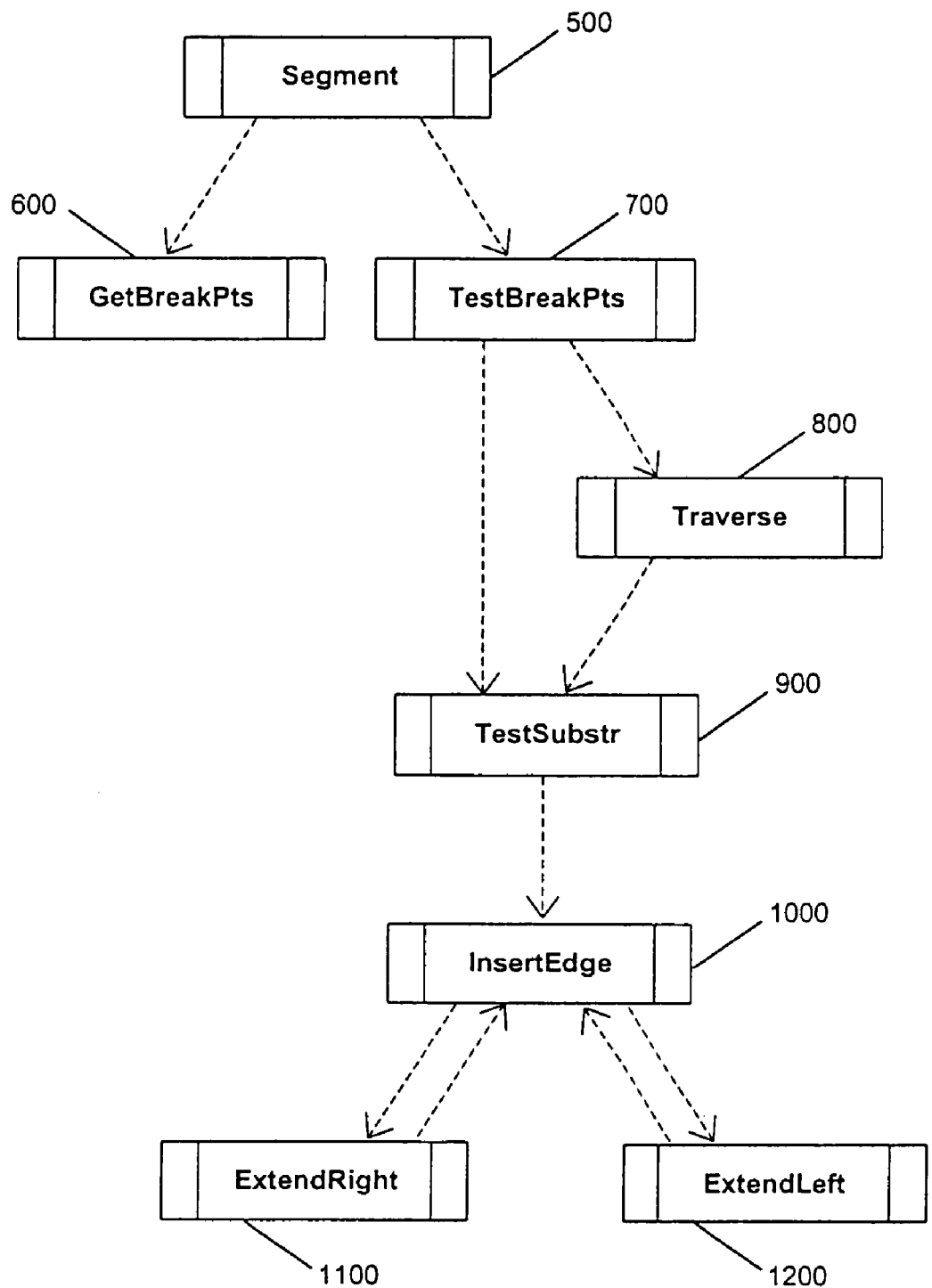
FIG. 10 illustrates the process dependencies of a method for efficiently segmenting compound words according to the present invention.

FIG. 10 illustrates the process dependencies for a method of efficiently segmenting compound words using probabilistic breakpoint traversal, corresponding to steps 101 through 104 of FIG. 1. These process dependencies may be thought of as a hierarchy of processes performed in efficiently segmenting compound words. The segmentation process Segment 500, shown at the top of FIG. 10, ultimately achieves the efficient segmentation of compound words by executing or performing the various lower level processes of FIG. 10. The segmentation process Segment 500 of FIG. 10 is further detailed in FIG. 1.

As illustrated in FIG. 10, the performance of the segmentation process Segment 500 calls for the execution of the breakpoint-accumulation process GetBreakPts 600 as a subprocess, or subroutine, to the Segment 500 process. The breakpoint-accumulation process GetBreakPts 600 is further detailed in FIG. 12. Additionally, the performance of the segmentation process Segment 500 calls for the execution of the breakpoint-testing process TestBreakPts 700. The breakpoint-testing process TestBreakPts 700 is further detailed in FIG. 13.

In performing the breakpoint-testing process TestBreakPts 700, the breakpoint-traversal process Traverse 800 and the substring-testing process TestSubstr 900 are both executed as subprocesses or subroutines to the breakpoint-testing process TestBreakPts 700. The breakpoint-traversal process Traverse 800 is further detailed in FIG. 14 and the substring-testing process TestSubstr 900 is further detailed in FIG. 15. The substring-testing process TestSubstr 900 is also executed by the breakpoint-traversal process Traverse 800, as detailed in FIG. 14.

In performing the substring-testing process TestSubstr 900, the edge-insertion process InsertEdge 1000 is executed as a subprocess or subroutine to the substring-testing process TestSubstr 900. The edge-insertion process InsertEdge 1000 is further detailed in FIG. 16.

In performing the edge-insertion process InsertEdge 1000, the rightward-extension process ExtendRight 100 and the leftward-extension process ExtendLeft 1200 are both executed as subprocesses or subroutines to the edge-insertion process InsertEdge 1000. The rightward-extension process ExtendRight 1100 is further detailed in FIG. 17 and the leftward-extension process ExtendLeft 1200 is further detailed in FIG. 18. Each of these processes may execute the edge-insertion process InsertEdge 1000 as is further detailed in FIGS. 17 and 18.

Referring back to FIG. 11, the segmentation process Segment 500 is depicted, which corresponds to steps 101 through 104 of FIG. 1. The segmentation process 500 results in a segmented string indicating a segmentation of the natural-language input, interpreted as a compound word. This segmentation is achieved by operating on objects of two classes, an Edge class and a Chart class, which are characterized as follows.

An object of the Edge class encodes a linkable component (i.e., a sequence of at least one word or linking morpheme) constructed from at least one character of the natural-language input. Each Edge object has the following attributes: (1) its label (representing the linkable component); (2) its starting vertex (which identifies where in the natural-language input the linkable component encoded by the Edge begins); (3) its ending vertex (which identifies where in the natural-language input the linkable component encoded by the Edge ends); (4) a flag that indicates whether or not the Edge is right-linkable (as discussed below); (5) a flag that indicates whether or not the Edge is left-linkable (as discussed below); (6) a flag that indicates whether or not the Edge is a linking morpheme; and (7) the Edge's weight (as discussed below).

An object of the Chart class encodes progress made toward segmentation of the natural-language input. The Chart consists of an ordered set of vertices representing the breakpoints between the characters of the natural-language input. During the course of the probabilistic breakpoint traversal method of the present invention, Edge objects representing linkable components are entered into the Chart. When an Edge object is entered into the Chart, it is bidirectionally extended by creating new Edge objects in the Chart based on any Edge objects already in the chart which both (a) are contiguous to the new Edge object and (b) satisfy linkability requirements as discussed below. When an Edge object is constructed that spans the Chart (i.e., the starting vertex of the Edge is the first vertex of the Chart and the ending vertex of the Edge is the last vertex of the Chart), then the compound has been successfully segmented.

As discussed above in conjunction with FIG. 5, in the presently preferred embodiment of the present invention each vertex $v_i$ in the Chart has associated with it the following two linked lists: (1) a list of the Edge objects in the Chart that have $v_i$ as their starting vertex and (2) a list of the Edge objects in the Chart that have $v_i$ as their ending vertex. In the present embodiment, these lists are sorted according to Edge weight, where Edge weight is an estimate of the probability that the Edge will contribute toward a rapid convergence of the probabilistic breakpoint traversal to a successful segmentation of the natural-language input.

Figure 11:
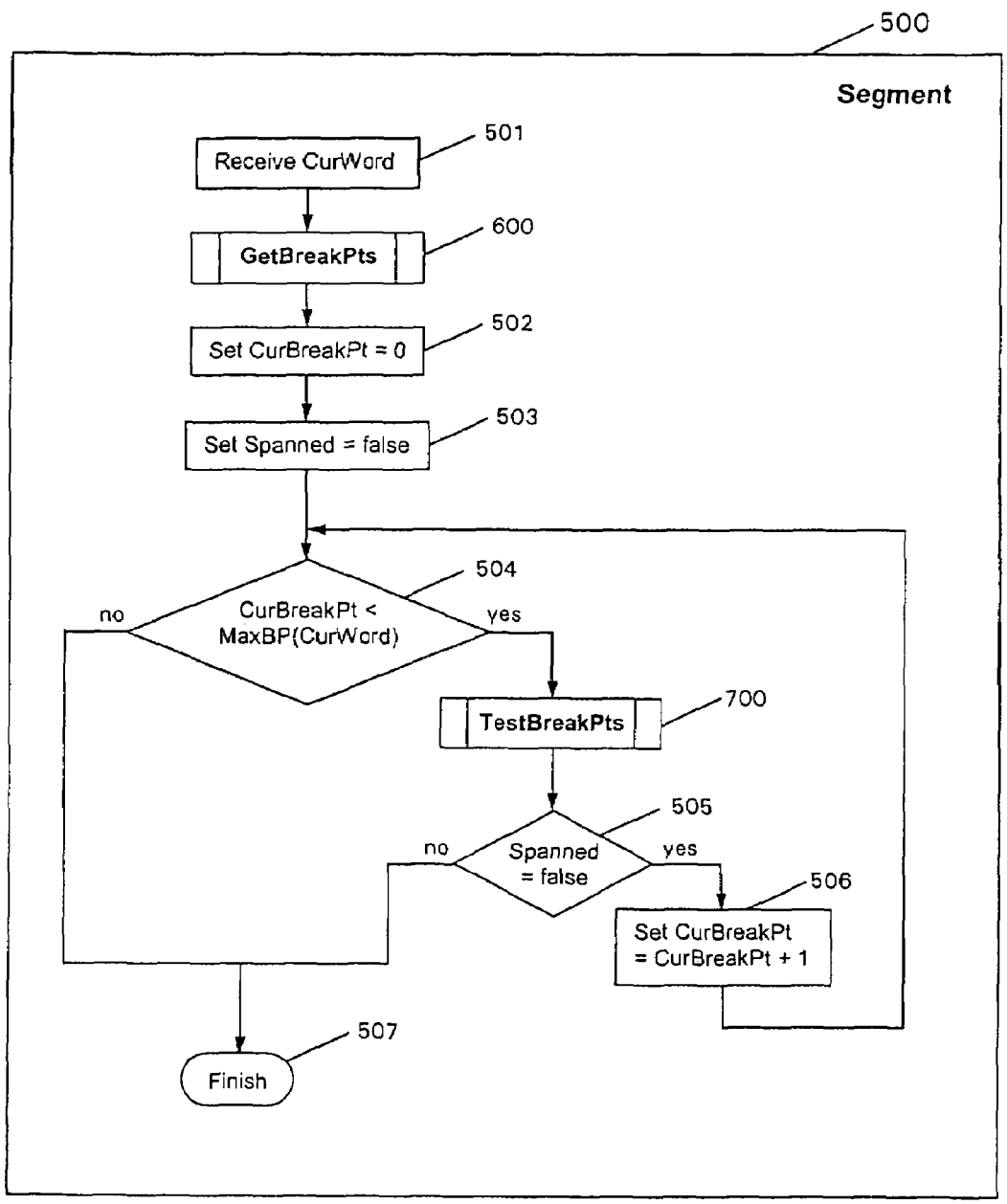
FIG. 11 is a flowchart of one embodiment of steps for efficiently segmenting compound words in accordance with the segmentation process Segment 500 of the present invention.

The segmentation process Segment 500 of FIG. 11 begins in step 501 by receiving as input a natural-language input consisting of a plurality of characters. Such a natural-language input would be, for instance, received from step 101 of FIG. 1. The natural-language input consists of a sequence of characters which is to be segmented and interpreted as a compound word.

After receiving the natural-language input CurWord in step 501, the segmentation process Segment 500 performs various initialization steps as follows. FIG. 11 illustrates the performance of these initializations, although they need not necessarily be performed in the sequence shown. Following step 501 in FIG. 11, the method proceeds to the breakpoint-accumulation process GetBreakPts 600, which constructs an ordered set of probabilistic breakpoints for the natural-language input according to the method of the present invention. In addition to executing the breakpoint-accumulation process, the method initializes its loop-control variables as follows: (1) the current-breakpoint index CurBreakPt is set to zero in step 502 and (2) the loop-completion flag Spanned is set to false in step 503. Steps 501, 502, 503, and 600 may be completed in any order as long as the completion of step 501 precedes the start of step 600.

In step 504, the current value of current-breakpoint index CurBreakPt is compared with the predetermined maximum breakpoint value MaxBP for the natural-language input CurWord. If CurBreakPt is less than MaxBP, then the method proceeds along the "yes" path to call the breakpoint-testing process TestBreakPts 700; otherwise the method proceeds along the "no" path to step 507. After the return of the breakpoint-testing process, the method proceeds to step 505.

In step 505, the current value of the loop-completion flag Spanned is examined to determine whether it is false. If Spanned is false, then the method proceeds along the "yes" path to step 506; otherwise, the method proceeds along the "no" path to step 507. In step 506, the current value of CurBreakPt is incremented by one and the method proceeds to step 504, where the breakpoint-processing loop exit condition is tested as discussed above. Finally, in step 507, the segmentation process exits by returning to its calling process.

Figure 12:
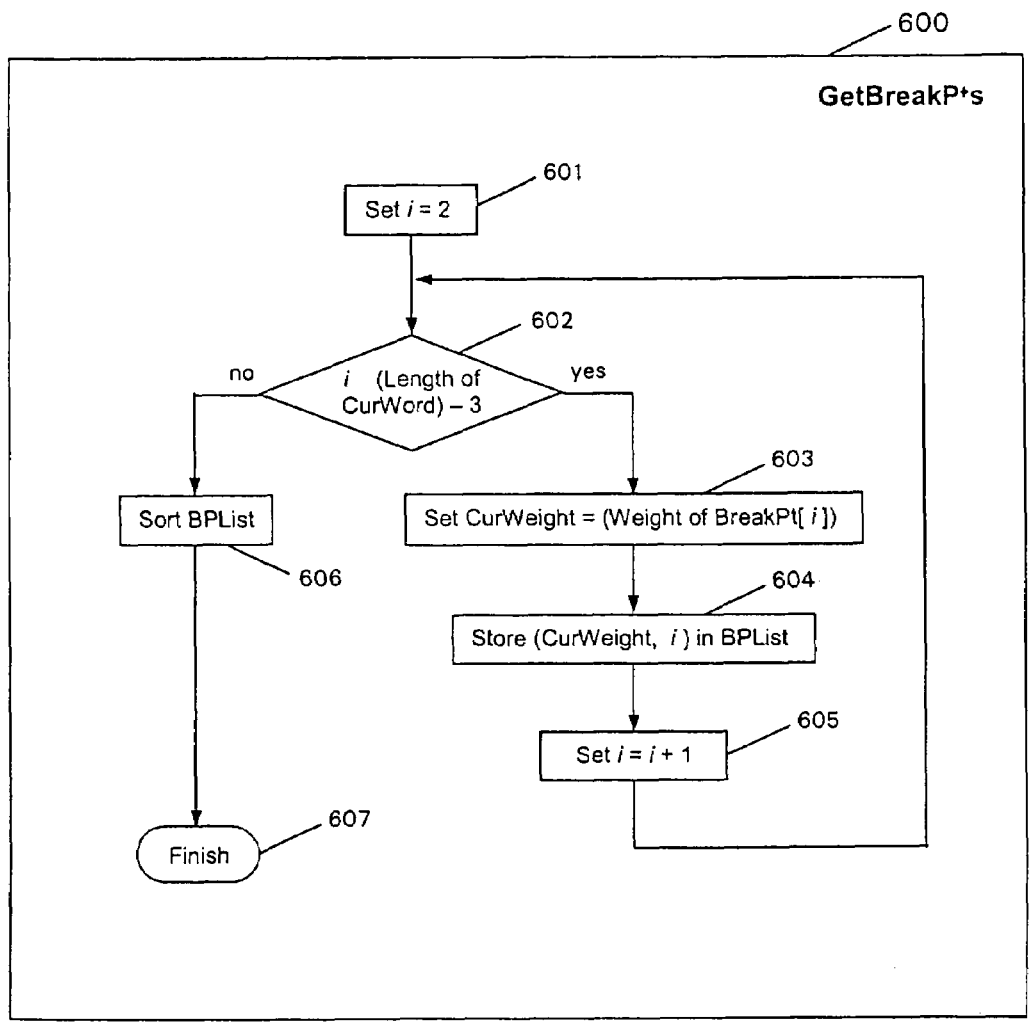
FIG. 12 is a flowchart of one embodiment of steps for identifying and sorting probabilistic breakpoints in accordance with the breakpoint-accumulation process GetBreakPts 600 of the present invention.

FIG. 12 depicts the breakpoint-accumulation process GetBreakPts 600 shown in FIG. 10. The breakpoint-accumulation process entails the construction of an ordered list of probabilistic breakpoints based on an analysis of the natural-language input, and thus corresponds to step 102 of FIG. 1. The breakpoint-accumulation process, which is implemented as a loop that processes one breakpoint per iteration, begins at step 601 by setting the loop counter i to the index of the vertex which corresponds to the first breakpoint weight to be calculated in the natural-language input. In the presently preferred embodiment of the present invention, which scores breakpoints based on trigraphs, the index of the first vertex to be considered in the natural-language input is 2, and the index of the last vertex to be considered in the natural-language input is L−3 (where L is the length of the natural-language input, counted in characters, and the index of the first character of the natural-language input is 0).

The method then proceeds to step 602, which is the exit condition for the breakpoint-processing loop. If the loop counter i is not greater than the index of the vertex of the last breakpoint to be considered in the natural-language input (i.e., L−3), then the method proceeds along the "yes" path to step 603, otherwise the method proceeds along the "no" path to step 606.

In step 603, the weight of the current breakpoint (which corresponds to the vertex $v_i$) is calculated by reference to the startpoint context and the endpoint context of the current breakpoint (as discussed above in conjunction with step 102 of FIG. 1), and the method proceeds to step 604. In step 604, an ordered pair consisting of the weight of the current breakpoint and the loop counter i (which indexes the vertex $v_i$ in the chart) is inserted into the breakpoint list BPList as discussed above in conjunction with FIG. 8. Finally, in step 605 the loop counter i is incremented by one and the method proceeds to step 602, which executes the exit condition of the loop as discussed above.

If the exit condition of the breakpoint-processing loop is satisfied (i.e., there are no more breakpoints to be processed in the natural-language input), then the method proceeds to step 606, which sorts BPList according to breakpoint weight as discussed above in conjunction with FIG. 8, resulting in an ordered list of breakpoints BPList. Finally, step 607 returns the ordered list of breakpoints BPList to the calling process.

Figure 13:
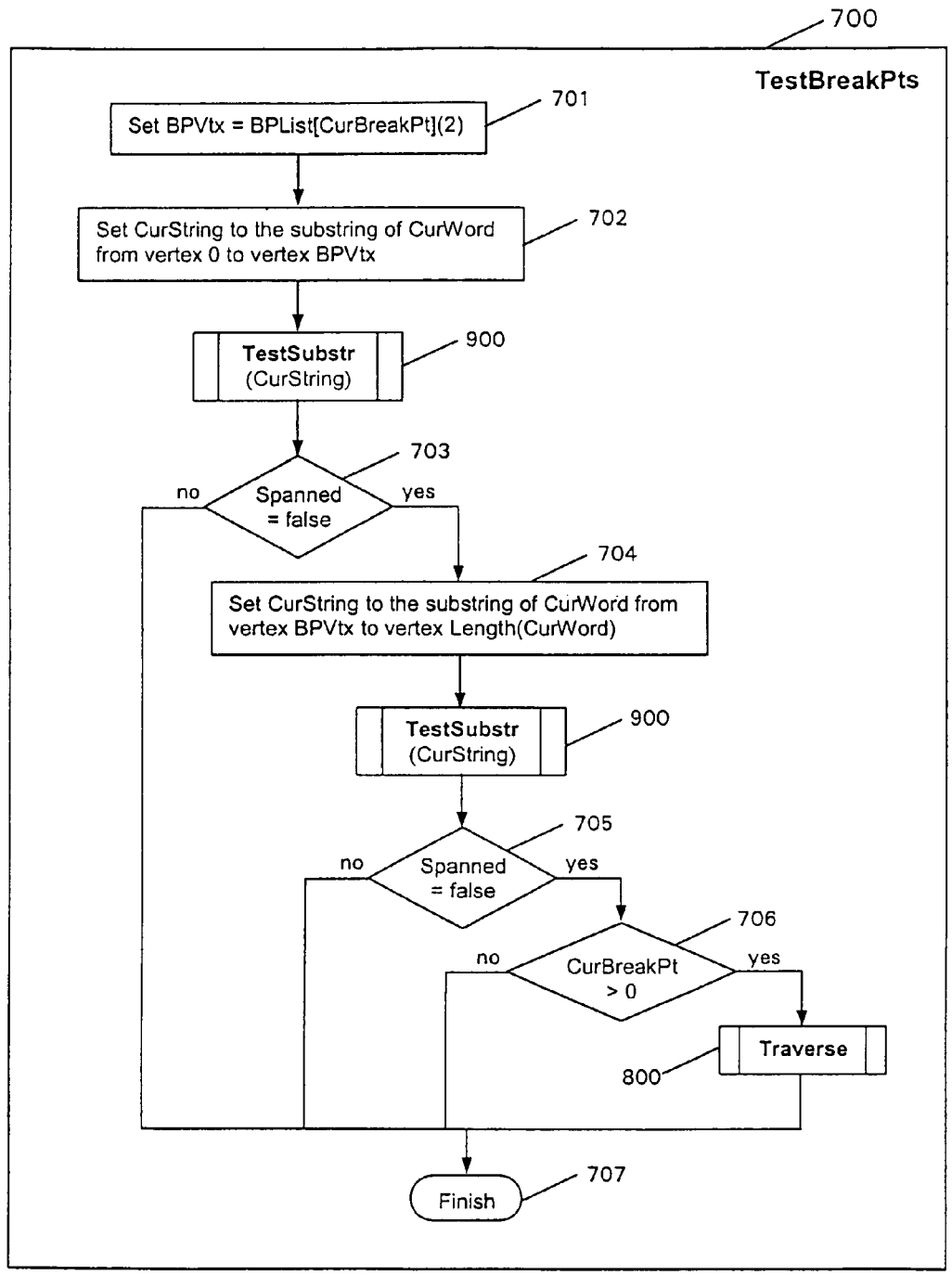
FIG. 13 is a flowchart of one embodiment of steps for testing the substrings delimited by probabilistic breakpoints in accordance with the breakpoint-testing process TestBreakPts 700 of the present invention.

FIG. 13 depicts the breakpoint-testing process TestBreakPts 700 shown in FIG. 10. The breakpoint-testing process entails the testing of the substrings of the natural-language input delimited by a traversal of the ordered list of probabilistic breakpoints constructed by the breakpoint-accumulation process, and thus corresponds to step 103 of FIG. 1. The breakpoint-testing process begins at step 701 by setting the value of the current breakpoint vertex BPVtx to the value of the second element of the ordered pair (i.e., the vertex index) indexed by the current value of CurBreakPt in the ordered list of breakpoints BPList.

Following step 701, the method proceeds to step 702, in which the current substring CurString is set equal to the substring of the natural-language input to the left of the vertex identified by current breakpoint vertex BPVtx. Following step 702, the method proceeds to call the substring-testing process TestSubstr 900 on the current value of CurString. Upon the return of the edge-insertion process, the chart-status flag Spanned is tested in step 703 to determine whether the insertion of the edge corresponding to CurString resulted in the complete spanning of the Chart. If Spanned is false, then the method proceeds along the "yes" path to step 704; otherwise the method proceeds along the "no" path to step 707.

In step 704, the value of CurString is set to the substring of the natural-language input to the right of the vertex identified by current breakpoint vertex BPVtx. Note that steps 702 and 704 may be executed in opposite order from the order shown in FIG. 13. Following step 704, the method proceeds to call the substring-testing process TestSubstr 900 on the current value of CurString. Upon the return of the edge-insertion process, the chart-status flag Spanned is tested in step 705 to determine whether the insertion of the edge corresponding to CurString resulted in the complete spanning of the Chart. If Spanned is false, then the method proceeds along the "yes" path to step 706; otherwise the method proceeds along the "no" path to step 707.

In step 706, the current breakpoint index CurBreakPt is tested to determine whether it is greater than one. If CurBreakPt is not greater than one, then the method proceeds along the "no" path to step 707; otherwise the method proceeds along the "yes" path to call to the breakpoint-traversal process Traverse 800. Upon return of the breakpoint-traversal process, the method proceeds to step 707. In step 707, the breakpoint-testing process TestBreakPts 700 returns to its calling process.

Figure 14:
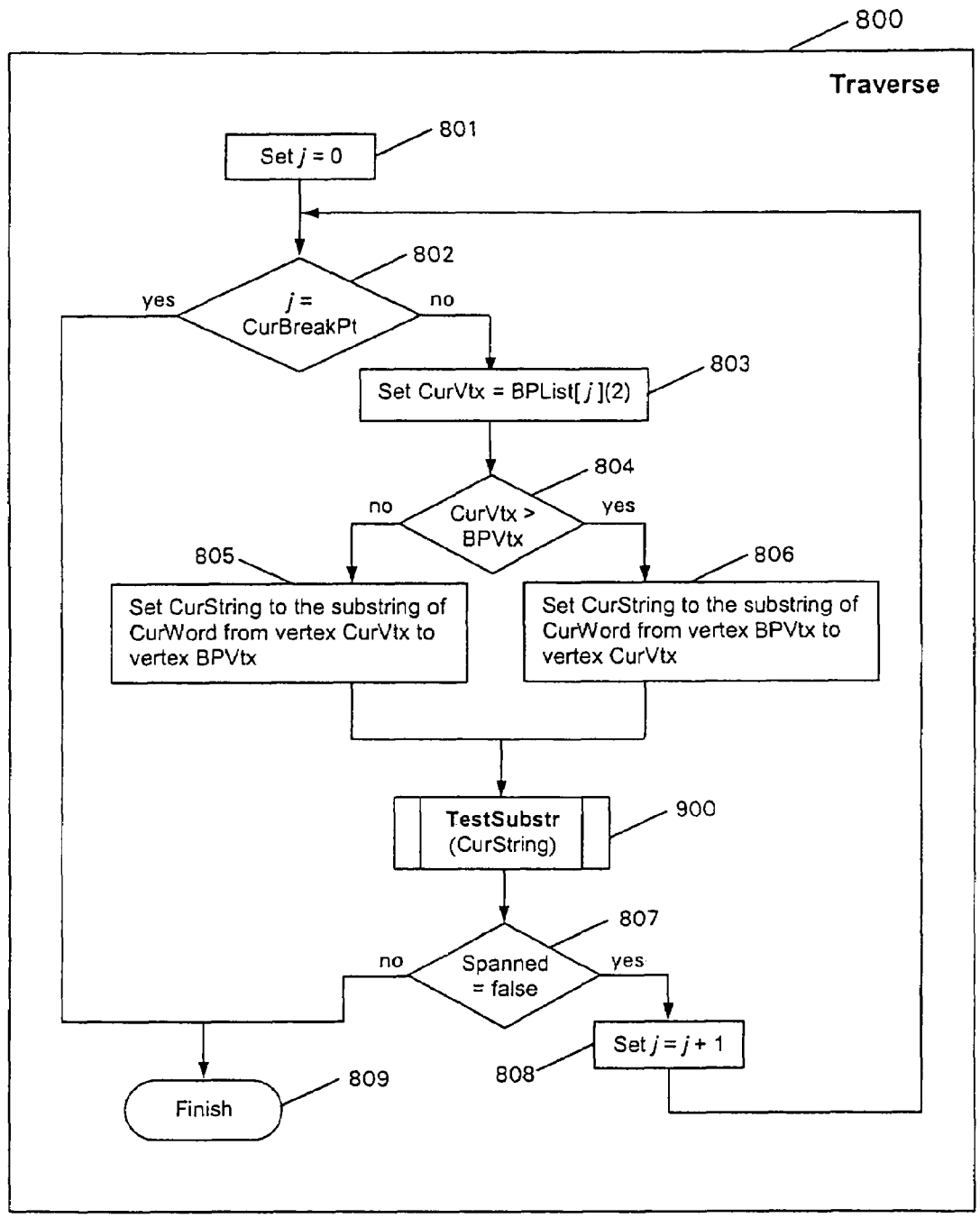
FIG. 14 is a flowchart of one embodiment of steps for traversing probabilistic breakpoints to obtain substrings in accordance with the breakpoint-traversal process Traverse 800 of the present invention.

FIG. 14 depicts the breakpoint-traversal process Traverse 800 shown in FIG. 10. The breakpoint-traversal process entails the testing of the substrings of the natural-language input delimited by a traversal, relative to the current value of the current breakpoint CurBreakPt, of the ordered list of probabilistic breakpoints constructed by the breakpoint-accumulation process. The breakpoint-traversal process begins at step 801 by setting the current value of the breakpoint-traversal loop index j to zero, and the method proceeds to step 802.

In step 802, the current value of the breakpoint-traversal loop index j is tested to determine whether it is equal to CurBreakPt. If j is equal to CurBreakPt, then the method proceeds along the "yes" path to step 809; otherwise the method proceeds along the "no" path to step 803. In step 803, the value of the current vertex CurVtx is set equal to the value of the second element of the ordered pair (i.e., the vertex index) indexed by the current value of the breakpoint-traversal loop index j in the ordered list of breakpoints BPList, and the method proceeds to step 804.

In step 804, the value of the current vertex CurVtx is tested to determine if it is greater than the value of current breakpoint vertex BPVtx. If CurVtx is greater than BPVtx, then the method proceeds along the "yes" path to step 806; otherwise the method proceeds along the "no" path to step 805.

In step 805, the current value of CurString is set equal to the substring of the natural-language input from the vertex CurVtx to the vertex BPVtx. Following step 805, the method proceeds to call the substring-testing process TestSubstr 900 on the current value of CurString.

In step 806, the current value of CurString is set equal to the substring of the natural-language input from the vertex BPVtx to the vertex CurVtx. Following step 806, the method proceeds to call the substring-testing process TestSubstr 900 on the current value of CurString.

Upon the return of the substring-testing process TestSubstr 900, the chart-status flag Spanned is tested in step 807 to determine whether the insertion of the edge corresponding to CurString resulted in the complete spanning of the Chart. If Spanned is false, then the method proceeds along the "yes" path to step 808; otherwise the method proceeds along the "no" path to step 809.

In step 808 the value of the breakpoint-traversal loop index j is incremented by one and the method proceeds to the loop exit condition in step 802. If the loop-exit condition is satisfied (i.e., the breakpoint-traversal loop indexj is equal to CurBreakPt), then the method exits the breakpoint-traversal loop by proceeding to step 809. In step 809 the breakpoint-traversal process finishes by returning to its calling process.

Figure 15:
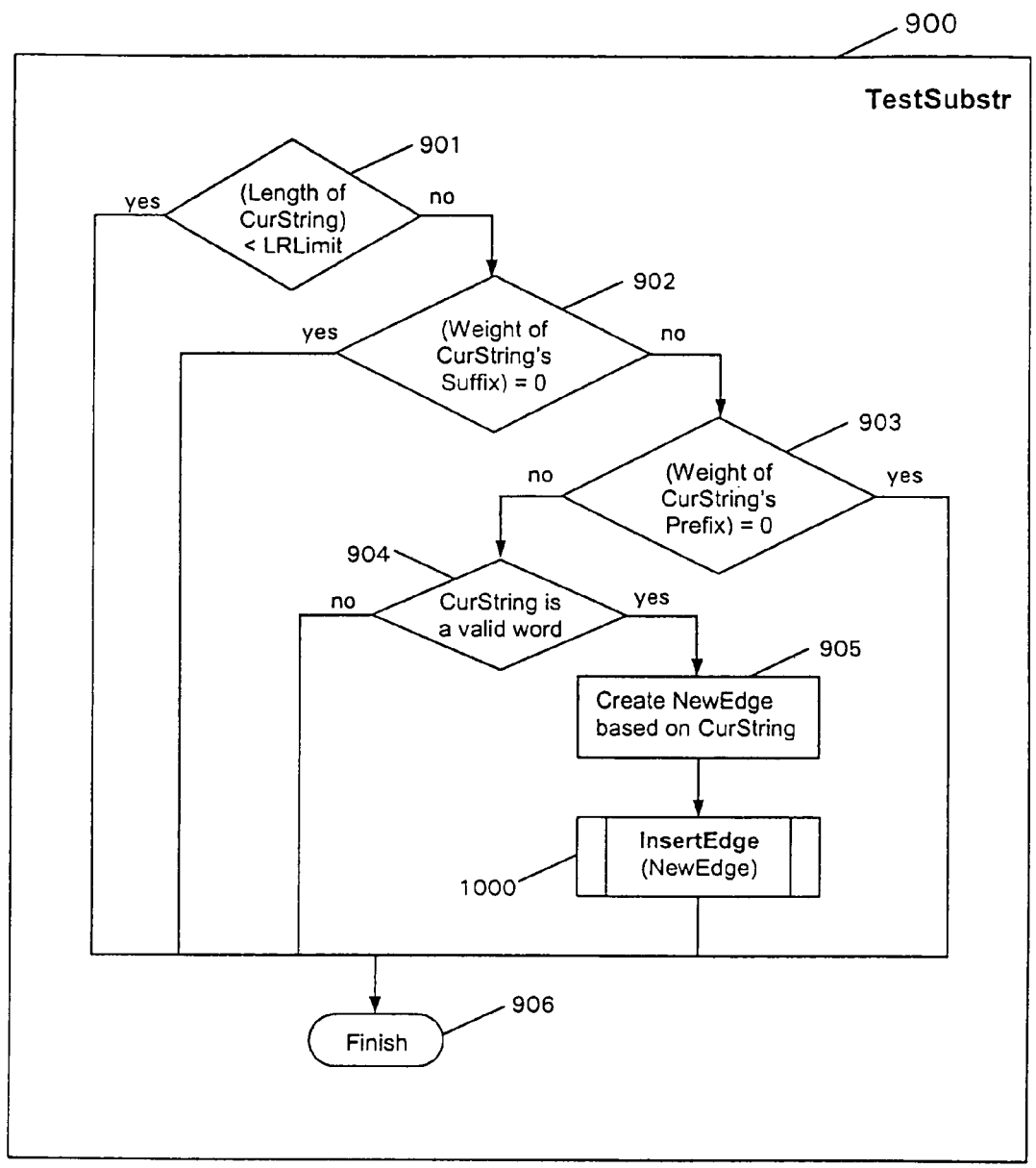
FIG. 15 is a flowchart of one embodiment of steps for testing a substring for inclusion in a chart used to encode segmentation progress in accordance with the substring-testing process TestSubstr 900 of the present invention.

FIG. 15 depicts the substring-testing process TestSubstr 900, shown in FIG. 10. The substring-testing process tests a substring for inclusion in the chart data structure used by the present invention to encode progress made toward segmentation of the natural-language input. The substring-testing process begins at step 901 by testing the length of the current substring CurString against a predetermined length limit LRLimit associated with the length restriction, discussed in conjunction with step 103 of FIG. 1. If the length of CurString is less than LRLimit, then the method proceeds along the "yes" path to step 906; otherwise the method proceeds along the "no" path to step 902.

In step 902, the weight of the suffix of CurString is tested to determine whether it is equal to zero. This test implements the final trigraph restriction, as discussed in conjunction with step 103 of FIG. 1. If the weight of the suffix of CurString is equal to zero, then the method proceeds along the "yes" path to step 906 otherwise the method proceeds along the "no" path to step 903.

In step 903, the weight of the prefix of CurString is tested to determine whether it is equal to zero. This test implements the initial trigraph restriction, as discussed in conjunction with step 103 of FIG. 1. If the weight of the prefix of CurString is equal to zero, then the method proceeds along the "yes" path to step 906; otherwise the method proceeds along the "no" path to step 904.

In step 904, the current substring CurString is tested to determine whether it is a valid word. As discussed in conjunction with step 103 of FIG. 1, this test is typically conducted by looking up the substring in a lexicon. As also discussed in conjunction with step 103 of FIG. 1, this gives the present invention the advantage of not being dependent on a specific lexicon architecture. If CurString is determined not to be a valid word, then the method proceeds along the "no" path to step 906; otherwise the method proceeds along the "yes" path to step 905. In step 905, a new Edge object NewEdge is created based on the current substring CurString as discussed above in conjunction with FIG. 11. Following step 905, the method proceeds to execute the edge-insertion process InsertEdge 1000 given the new Edge object NewEdge. Upon completion of the edge-insertion process InsertEdge 1000, the method proceeds to step 906. In step 906, the substring-testing process TestSubstr 900 returns to its calling process.

Figure 16:
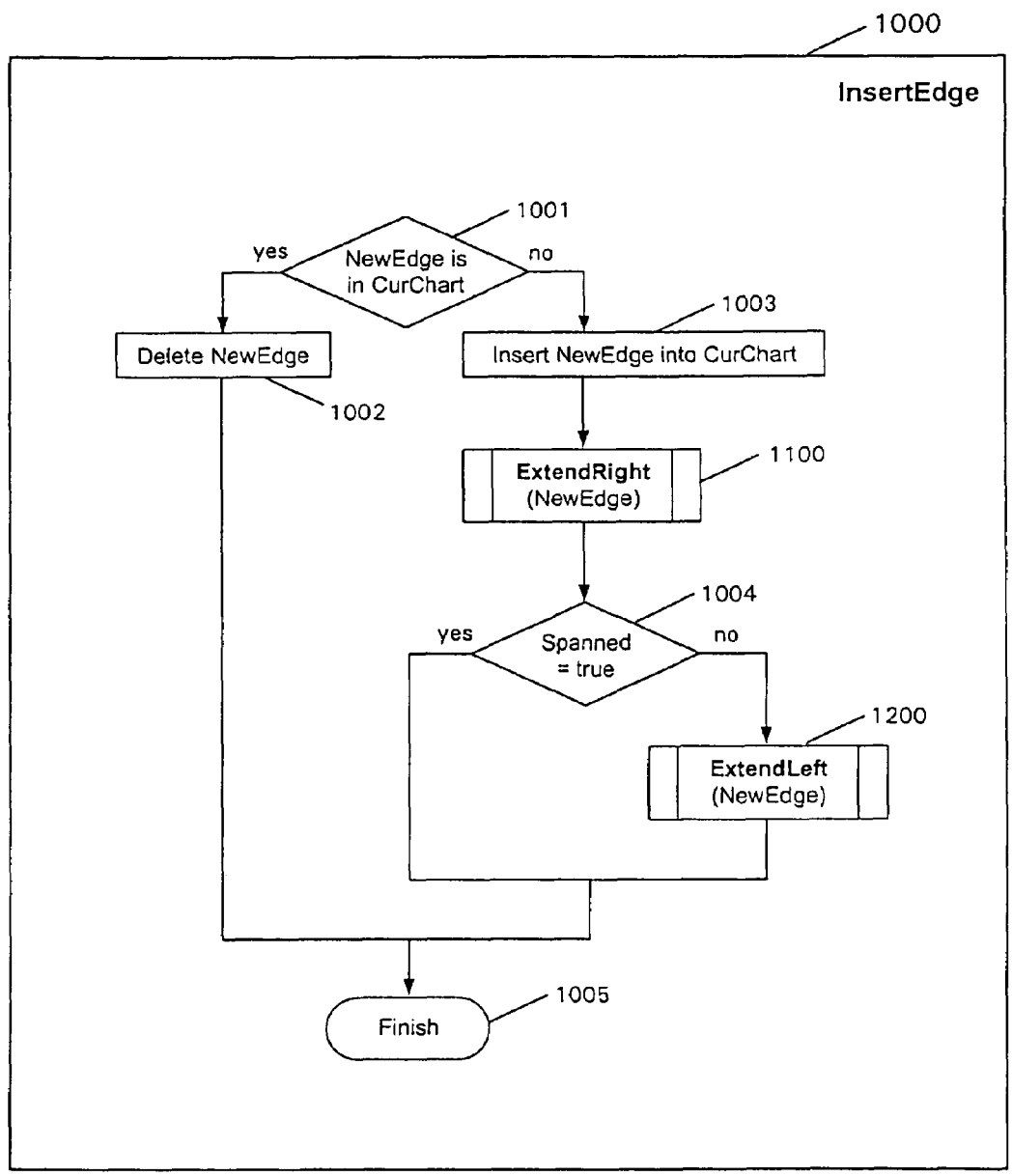
FIG. 16 is a flowchart of one embodiment of steps for inserting an edge in the chart used to encode segmentation progess in accordance with the edge-insertion process InsertEdge 1000 of the present invention.

FIG. 16 depicts the edge-insertion process InsertEdge 1000, shown in FIG. 10. The edge-insertion process entails the insertion of a new Edge object NewEdge into the chart (if it is not already there) and extends this edge relative to any edges already in the chart, as discussed above in conjunction with FIG. 6. The edge-insertion process begins at step 1001 by testing NewEdge to determine whether the edge is in the Chart object CurChart. If the edge is in CurChart, then the method proceeds along the "yes" path to step 1002; otherwise the method proceeds along the "no" path to step 1003.

In step 1002, NewEdge is deleted and the method proceeds to step 1005. In step 1003, NewEdge is inserted into CurChart, as discussed above in conjunction with FIG. 6. Following step 1003, the method proceeds to execute the rightward-extension process ExtendRight 1100 to perform all possible rightward extensions of NewEdge in CurChart.

Upon the return of the rightward-extension process, the method proceeds to step 1004. In step 1004, the current value of the edge-status flag Spanned is tested to determine whether it is equal to true. If Spanned is equal to true, then the method proceeds along the "yes" path to step 1005; otherwise the method proceeds along the "no" path to execute the leftward-extension process ExtendLeft 1200 to perform all possible leftward extensions of NewEdge in CurChart. Upon the return of the leftward-extension process, the method proceeds to step 1005. In step 1005 the edge-insertion process InsertEdge 1000 returns to its calling process.

Figure 17:
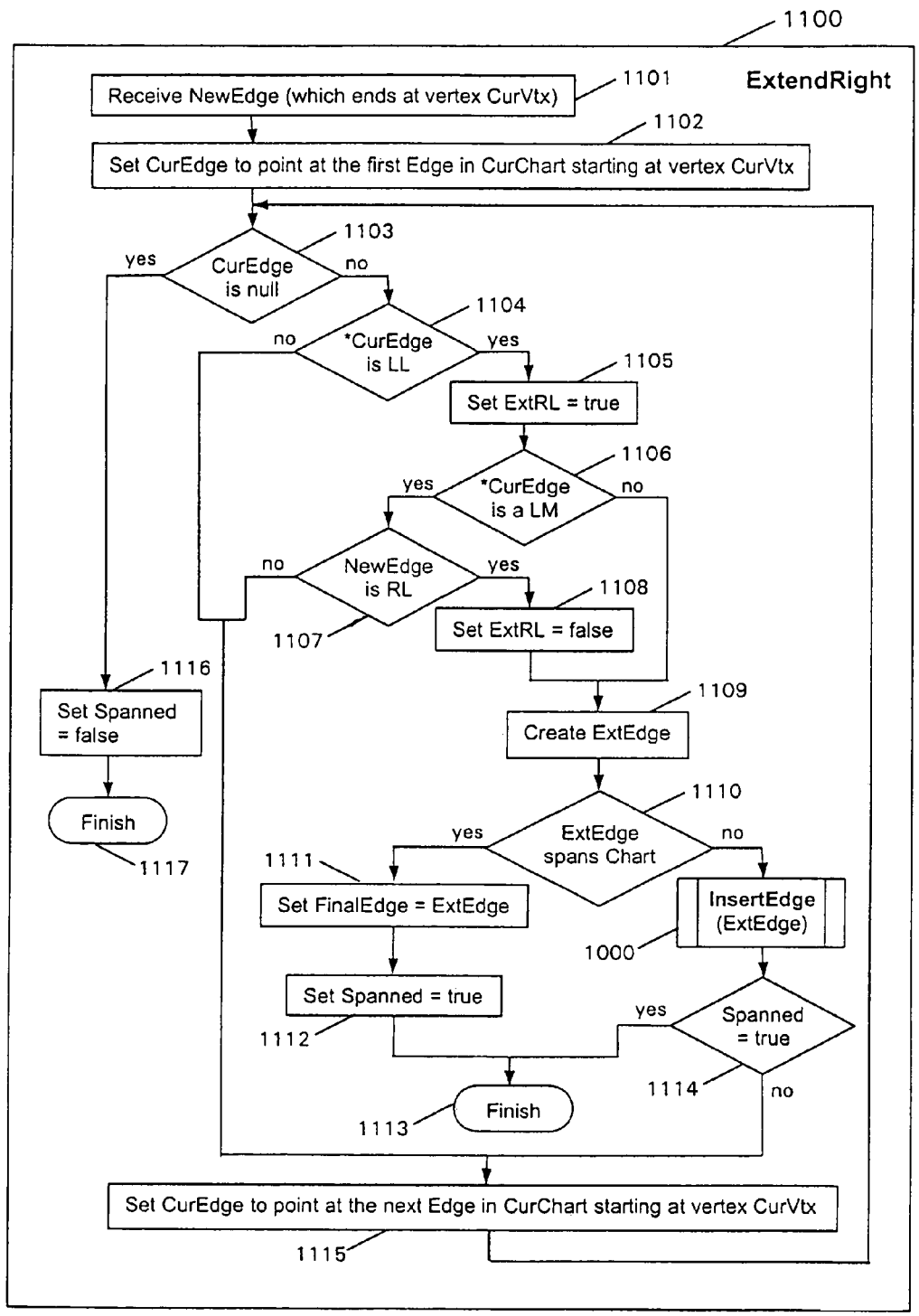
FIG. 17 is a flowchart of one embodiment of steps for rightward extension of an edge in the chart used to encode segmentation progess in accordance with the rightward-extension process ExtendRight 1100 of the present invention.

FIG. 17 depicts the rightward-extension process ExtendRight 1100, which extends an edge NewEdge to its right in the Chart object CurChart, as follows. In step 1101, the edge NewEdge, which ends at a vertex CurVtx in CurChart, is received, and the method proceeds to step 1102. In step 1102, the CurEdge pointer is set to point at the first Edge in CurChart that starts at vertex CurVtx. In step 1103, if CurEdge is null, then the method proceeds along the "yes" path from step 1103 to step 1116. Otherwise, the method proceeds along the "no" path from step 1103 to step 1104.

In step 1104, if the Edge pointed at by CurEdge is "left-linkable" (LL), as discussed above in conjunction with FIG. 6, then the method proceeds along the "yes" path to step 1105. Otherwise, the method proceeds along the "no" path from step 1104 to step 1115. In step 1105, the "extension edge will be right-linkable" flag (ExtRL) is set to "true", and the method proceeds to step 1106.

In step 1106, if the Edge pointed at by CurEdge is a linking morpheme (LM), as discussed above in conjunction with FIG. 6, then the method proceeds along the "yes" path from step 1106 to step 1107. Otherwise, the method proceeds along the "no" path from step 1106 to step 1109. In step 1107, if NewEdge is "right-linkable" (RL), as discussed above in conjunction with FIG. 6, then the method proceeds along the "yes" path to step 1108. Otherwise the method proceeds along the "no" path to step 1115. In step 1108, the "extension edge will be right-linkable" flag (ExtRL) is set to "false" and the method proceeds to step 1109.

In step 1109, the "extension edge" (ExtEdge) is created because it has been determined that NewEdge can be extended by the edge pointed at by CurEdge. The creation of ExtEdge is accomplished by allocating a new Edge object and setting its attributes as discussed above in conjunction with FIG. 10. The method then proceeds to step 1110.

In step 1110, the extension edge ExtEdge is inspected to determine if it spans CurChart (i.e., its first vertex is zero and its last vertex is equal to the last vertex in CurChart, as discussed above in conjunction with FIG. 6). If the extension edge ExtEdge spans CurChart, then the method proceeds along the "yes" path to step 1111. Otherwise, the method proceeds along the "no" path to execute the edge-insertion process InsertEdge 1000 on the extension edge ExtEdge, as is further detailed in FIG. 16 above. Upon the return of the edge-insertion process InsertEdge 1000, the method proceeds to step 1114.

In step 1111, the final-edge pointer FinalEdge is set to point at ExtEdge and the method proceeds to step 1112, in which the chart-status flag Spanned is set equal to true (steps 1111 and 1112 may be executed in any order). The method then proceeds to step 1113. In step 1113, the ExtendRight 1100 process finishes by returning to its calling process.

In step 1114, the value of the chart-status flag Spanned is examined to determine whether it is true. If Spanned is true, then the method proceeds along the "yes" path to step 1113; otherwise the method proceeds along the "no" path to step 1115.

In step 1115, the current-edge pointer CurEdge is set to point at the next edge starting at vertex CurVtx in CurChart, and the method proceeds to step 1103 to check whether CurEdge is null (if CurEdge is null, then the method proceeds along the "yes" path to step 1116; otherwise it continues the edge-processing loop by proceeding along the "no" path to step 1104).

In step 1116, the chart-status flag Spanned is set equal to false and the method proceeds to step 1117. In step 1117 the process ExtendRight 1100 finishes by returning to its calling process.

Figure 18:
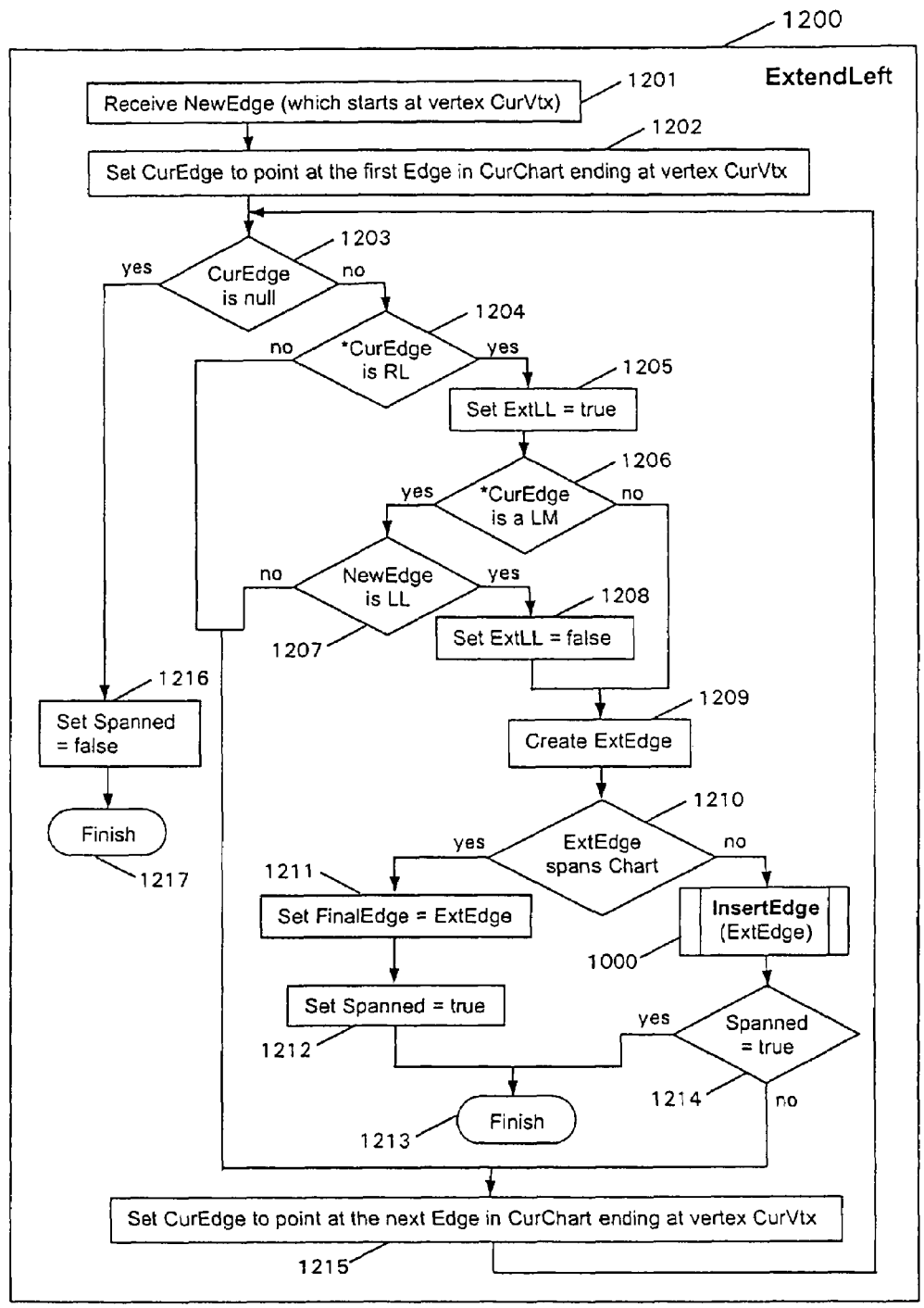
FIG. 18 is a flowchart of one embodiment of steps for leftward extension of an edge in the chart used to encode segmentation progress in accordance with the leftward-extension process ExtendLeft 1200 of the present invention.

FIG. 18 depicts the leftward-extension process ExtendLeft 1200, which extends an edge NewEdge to its left in the current Chart object CurChart, as follows. In step 1201, the edge NewEdge, which starts at a vertex CurVtx in CurChart, is received, and the method proceeds to step 1202. In step 1202, the CurEdge pointer is set to point at the first Edge in CurChart that ends at vertex CurVtx. In step 1203, if CurEdge is null, then the method proceeds along the "yes" path from step 1203 to step 1216. Otherwise, the method proceeds along the "no" path from step 1203 to step 1204.

In step 1204, if the Edge pointed at by CurEdge is "right-linkable" (RL), as discussed above in conjunction with FIG. 6, then the method proceeds along the "yes" path to step 1205. Otherwise, the method proceeds along the "no" path from step 1204 to step 1215. In step 1205, the "extension edge will be left-linkable" flag (ExtLL) is set to true, and the method proceeds to step 1206.

In step 1206, if the Edge pointed at by CurEdge is a linking morpheme (LM), as discussed above in conjunction with FIG. 6, then the method proceeds along the "yes" path from step 1206 to step 1207. Otherwise, the method proceeds along the "no" path from step 1206 to step 1209. In step 1207, if NewEdge is "left-linkable" (LL), as discussed above in conjunction with FIG. 6, then the method proceeds along the "yes" path to step 1208. Otherwise the method proceeds along the "no" path to step 1215. In step 1208, the "extension edge will be left-linkable" flag (ExtLL) is set to false and the method proceeds to step 1209.

In step 1209, the "extension edge" (ExtEdge) is created because it has been determined that NewEdge can be extended by the edge pointed at by CurEdge. The creation of ExtEdge is accomplished by allocating a new Edge object and setting its attributes as discussed above in conjunction with FIG. 10. The method then procees to step 1210.

In step 1210, the extension edge ExtEdge is inspected to determine if it spans CurChart (i.e., its first vertex is zero and its last vertex is equal to the last vertex in CurChart, as discussed above in conjunction with FIG. 6). If the extension edge ExtEdge spans CurChart, then the method proceeds along the "yes" path to step 1211. Otherwise, the method proceeds along the "no" path to execute the edge-insertion process InsertEdge 1000 on the extension edge ExtEdge, as is further detailed in FIG. 16 above. Upon the return of the edge-insertion process InsertEdge 1000, the method proceeds to step 1214.

In step 1211, the final-edge pointer FinalEdge is set to point at ExtEdge and the method proceeds to step 1212, in which the chart-status flag Spanned is set equal to true (steps 1211 and 1212 may be executed in any order). The method then proceeds to step 1213. In step 1213, the ExtendLeft 1200 process finishes by returning to its calling process.

In step 1214, the value of the chart-status flag Spanned is examined to determine whether it is true. If Spanned is true, then the method proceeds along the "yes" path to step 1213; otherwise the method proceeds along the "no" path to step 1215.

In step 1215, the current-edge pointer CurEdge is set to point at the next edge ending at vertex CurVtx in CurChart, and the method proceeds to step 1203 to check whether CurEdge is null (if CurEdge is null, then the method proceeds along the "yes" path to step 1216; otherwise it continues the edge-processing loop by proceeding along the "no" path to step 1204).

In step 1216, the chart-status flag Spanned is set equal to false and the method proceeds to step 1217. In step 1217 the process ExtendLeft 1200 finishes by returning to its calling process.

Figure 19:
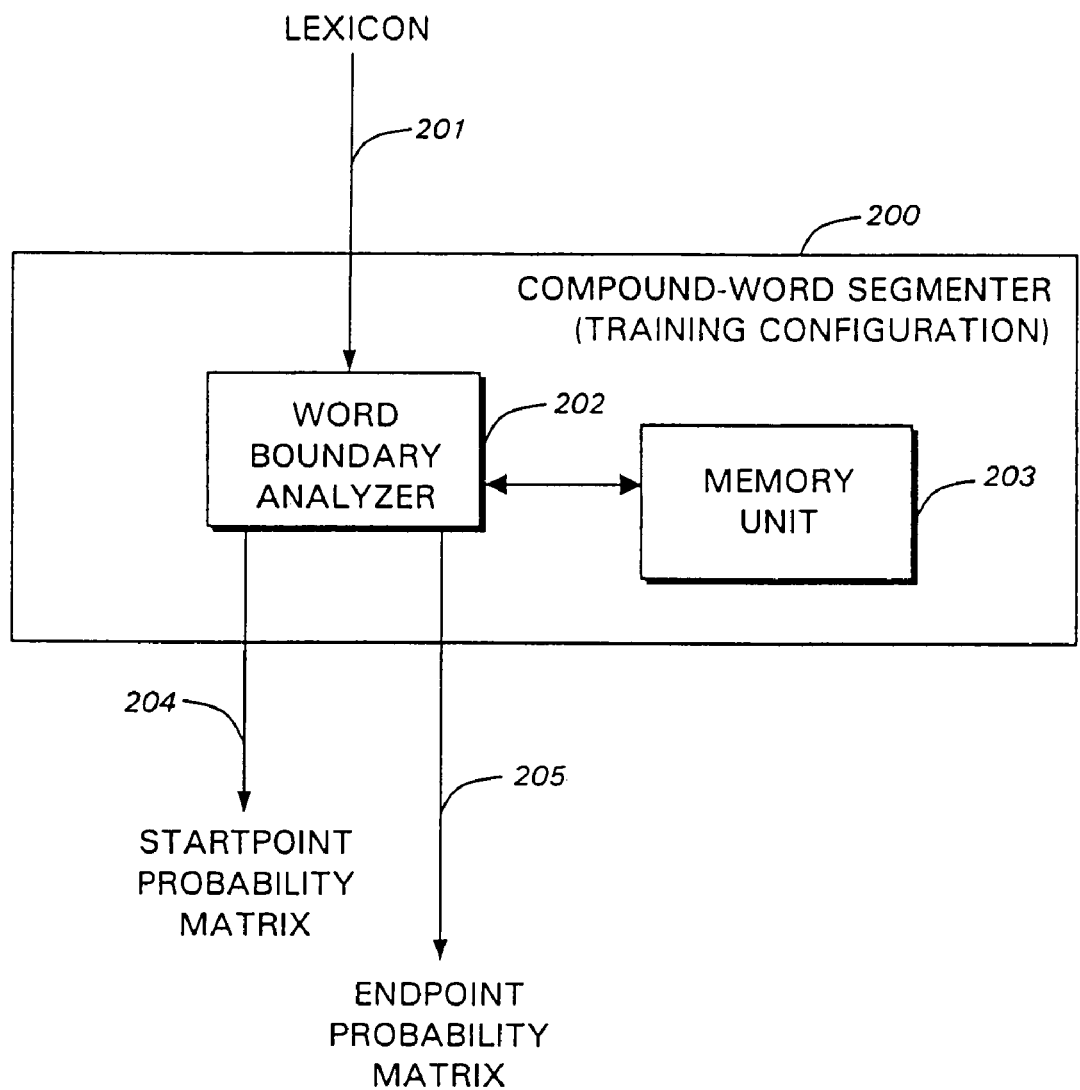
FIG. 19 is an embodiment of the present invention in a training configuration.

FIG. 19 presents a schematic of a training configuration of a compound-word segmenter 200 for the present invention, which is interpreted as follows. A word boundary analyzer 202, coupled to a memory unit 203, accepts as input a lexicon 201 and analyzes all starting and ending contexts of the words in the lexicon as described above in conjunction with step 104 of FIG. 1, and produces as output a startpoint probability matrix 204 and an endpoint probability matrix 205.

Figure 20:
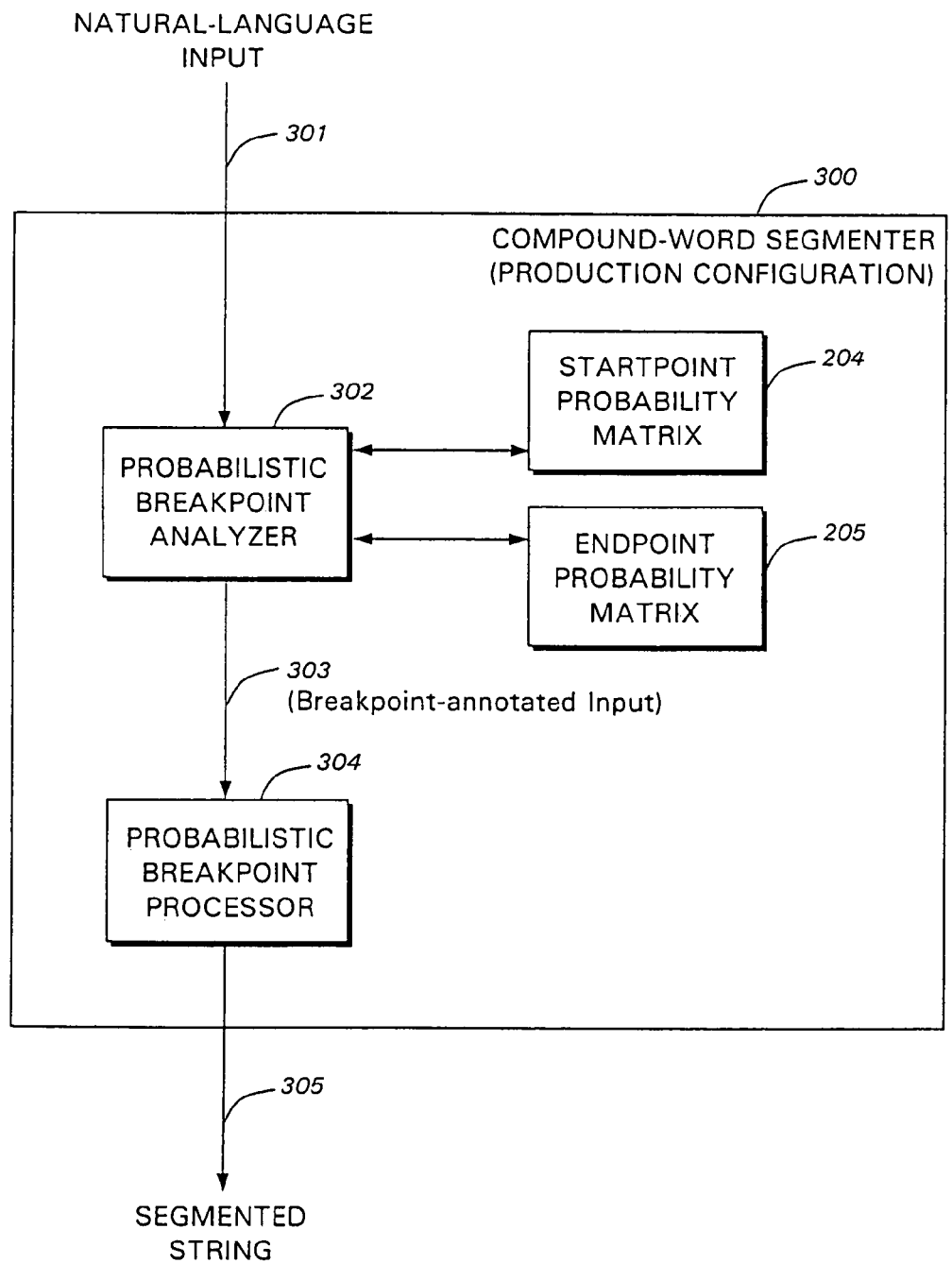
FIG. 20 is an embodiment of the present invention in a production configuration.

FIG. 20 presents a schematic of a production configuration of a compound-word segmenter 300 of the present invention, which is interpreted as follows. A probabilistic breakpoint analyzer 302, coupled to the startpoint probability matrix 204, the endpoint probability matrix 205, and a probabilistic breakpoint processor 304, accepts as input a natural-language input 301, processes it as described above in conjunction with step 102 of FIG. 1, and produces as output a breakpoint-annotated input 303. The probabilistic breakpoint processor 304 then accepts as input the breakpoint-annotated input, processes it as described above in conjunction with step 103 of FIG. 1, and produces as output a segmented string 305.

Figure 21:
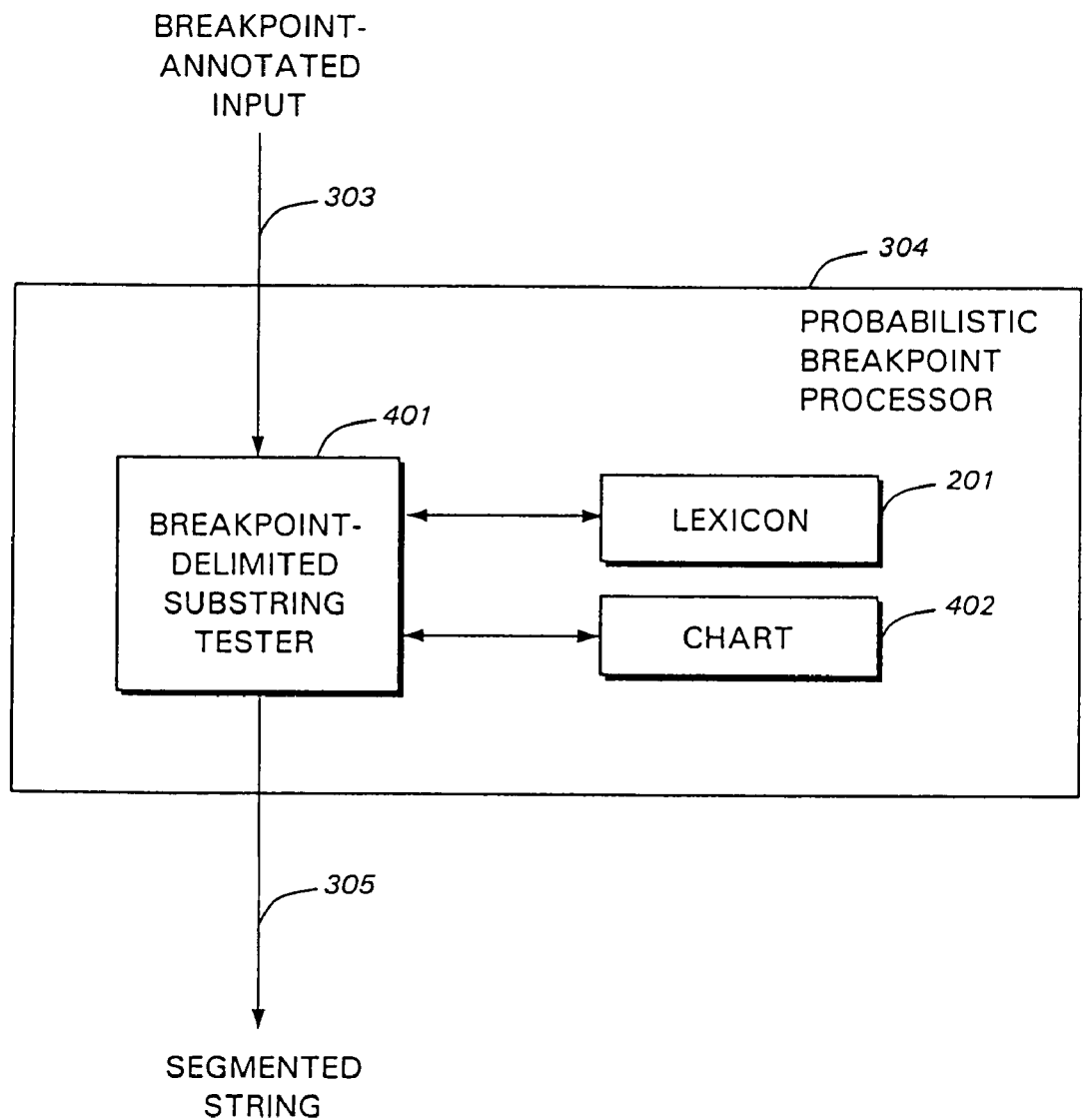
FIG. 21 is an embodiment of a probabilistic breakpoint processor of the present invention.

FIG. 21 presents a schematic of the probabilistic breakpoint processor 304 of the present invention, which is interpreted as follows. A breakpoint-delimited substring tester 401, coupled to the lexicon 201 and a chart 402, accepts as input the breakpoint-annotated input 303, processes it as described above in conjunction with step 103 of FIG. 1, and produces as output the segmented string 305.

Figure 22:
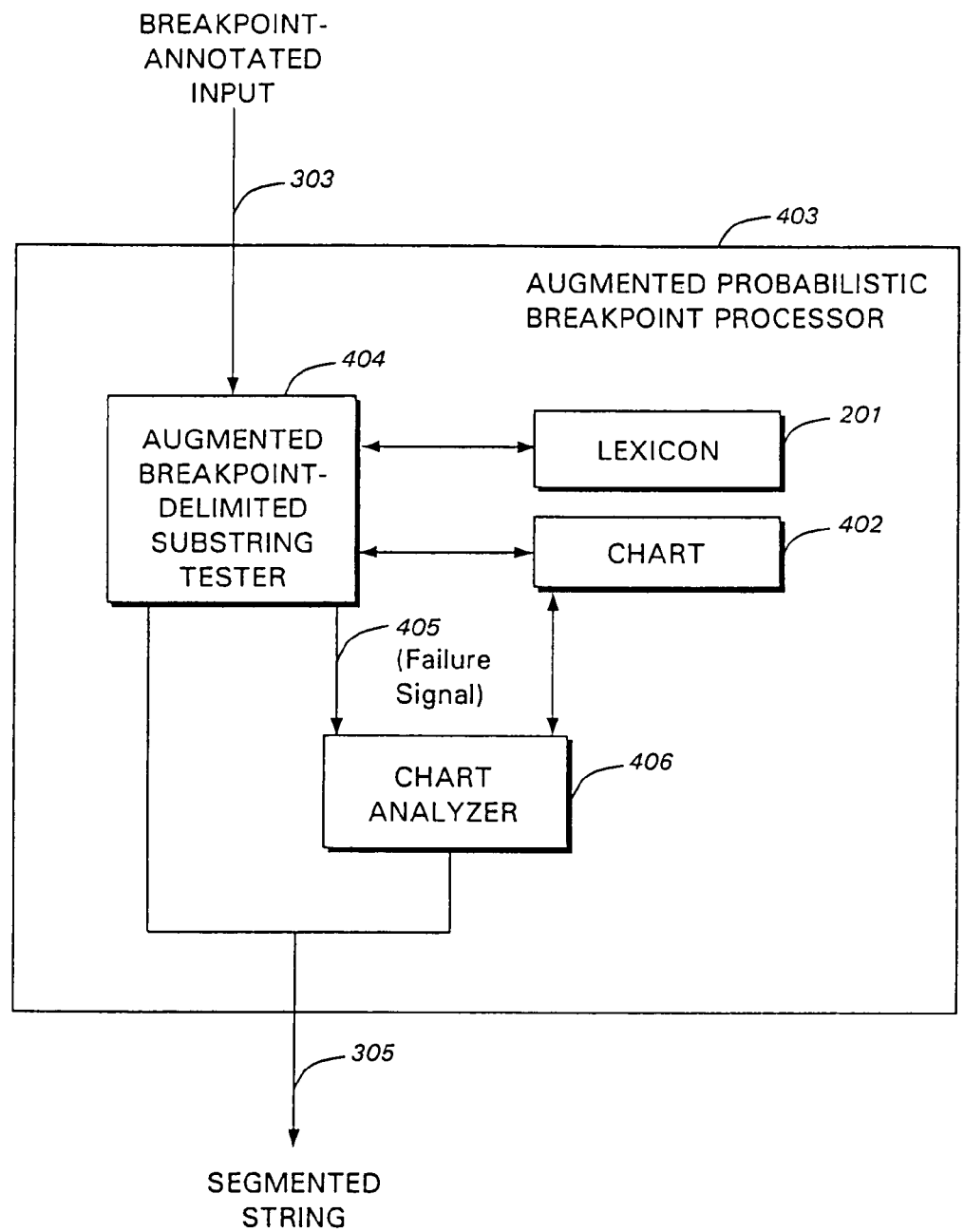
FIG. 22 is an embodiment of an augmented probabilistic breakpoint processor of the present invention.

FIG. 22 presents a schematic of an augmented probabilistic breakpoint processor 403 of the present invention, which is interpreted as follows. An augmented breakpoint-delimited substring tester 404, coupled to the lexicon 201, the chart 402, and a chart analyzer 406, accepts as input the breakpoint-annotated input 303, processes it as described above in conjunction with step 103 of FIG. 1, and produces as output either the segmented string 305 or a failure signal 405. In the latter case, the chart analyzer 406, coupled to the augmented breakpoint-delimited substring tester 404 and the chart 402, accepts as input the failure signal, analyzes the chart as described above in conjunction with FIG. 9, and produces as output the segmented string 305.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

The invention claimed is:

1. An apparatus for segmenting compound words in a natural-language input, the apparatus comprising:
   a startpoint probability matrix;
   a endpoint probability matrix;
   a probabilistic breakpoint analyzer having access to the startpoint probability matrix, the endpoint probability matrix and the natural-language input, the probabilistic breakpoint analyzer being operative to generate a breakpoint-annotated input from the natural-language input; and
   a probabilistic breakpoint processor coupled to the probabilistic breakpoint analyzer, the probabilistic breakpoint processor being operative to generate a segmented string for the compound words in the natural-language input in response to the breakpoint-annotated input.

2. The apparatus of claim 1, further comprising a word-boundary analyzer having access to a lexicon and a memory unit, the word-boundary analyzer being operative to generate the startpoint probability matrix and the endpoint probability matrix.

3. The apparatus of claim 1, wherein the probabilistic breakpoint processor comprises:
   a lexicon;
   a chart; and
   a breakpoint-delimited substring tester having access to the lexicon and the chart, the substring tester being operative to receive the breakpoint-annotated input and generate a segmented string in response thereto.

4. The apparatus of claim 1, wherein the probabilistic breakpoint processor is an augmented probabilistic breakpoint processor comprising:
   a lexicon;
   a chart;
   an augmented breakpoint-delimited substring tester having access to the chart and the lexicon, the substring tester being operative to identify a plurality of linkable components; and
   a chart analyzer coupled to the substring tester and having access to the chaff, the chart analyzer being operative to generate the segmented string.

5. The apparatus of claim 4, wherein the augmented breakpoint-delimited substring tester generates one of:
   the segmented string; and
   a failure signal.

6. The apparatus of claim 5, wherein the chart analyzer is coupled to receive the failure signal from the augmented breakpoint-delimited substring tester.

7. The apparatus of claim 1, wherein the apparatus is configured as a computer readable program code run on a computer usable medium.

8. A method for segmenting compound words in an unrestricted natural-language input, the method comprising:
   receiving a natural-language input consisting of a plurality of characters;
   constructing a set of breakpoints in the natural-language input;
   combining weights of trigraph contexts that precede and follow each breakpoint to assign a weight to the breakpoint in the natural-language input;
   traversing substrings of the natural-language input in an order determined by the weights assigned to the breakpoints;
   identifying a plurality of linkable components by the traversal of substrings wherein a linkable component is identified by locating the component in a lexicon; and
   returning a segmented string consisting of a plurality of linkable components spanning the natural-language input, wherein the segmented string is interpreted as a compound word.

9. A method for segmenting compound words in an unrestricted natural-language input, the method comprising:
   receiving a natural-language input consisting of a plurality of characters;
   constructing a set of breakpoints in the natural-language input;
   combining weights of bigraph contexts that precede and follow each breakpoint to assign a weight to the breakpoint in the natural-language input;
   traversing substrings of the natural-language input in an order determined by the weights assigned to the breakpoints;
   identifying a plurality of linkable components by the traversal of substrings wherein a linkable component is identified by locating the component in a lexicon; and
   returning a segmented string consisting of a plurality of linkable components spanning the natural-language input, wherein the segmented string is interpreted as a compound word.

10. A method for segmenting compound words in an unrestricted natural-language input, the method comprising:
   receiving a natural-language input consisting of a plurality of characters;
   constructing a set of breakpoints in the natural-language input;
   combining weights of tetragraph contexts that precede and follow each breakpoint to assign a weight to the breakpoint in the natural-language input;
   traversing substrings of the natural-language input in an order determined by the weights assigned to the breakpoints;
   identifying a plurality of linkable components by the traversal of substrings wherein a linkable component is identified by locating the component in a lexicon; and
   returning a segmented string consisting of a plurality of linkable components spanning the natural-language input, wherein the segmented string is interpreted as a compound word.

* * * * *

UNITED STATES PATENT AND TRADEMARK OFFICE
CERTIFICATE OF CORRECTION

PATENT NO. : 7,610,189 B2 Page 1 of 1
APPLICATION NO. : 10/042528
DATED : October 27, 2009
INVENTOR(S) : Andrew William Mackie It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1302 days.

Signed and Sealed this

Twelfth Day of October, 2010

David J. Kappos
*Director of the United States Patent and Trademark Office*